(12) United States Patent
Chattoraj et al.

(10) Patent No.: US 10,816,285 B2
(45) Date of Patent: Oct. 27, 2020

(54) THERMOELECTRIC DEPOSIT MONITOR

(71) Applicant: Ecolab USA Inc., St. Paul, MN (US)

(72) Inventors: Mita Chattoraj, Warrenville, IL (US); Michael J. Murcia, Dekalb, IL (US)

(73) Assignee: Ecolab USA Inc., Saint Paul, MN (US)

( * ) Notice: Subject to any disclaimer, the term of this patent is extended or adjusted under 35 U.S.C. 154(b) by 42 days.

(21) Appl. No.: 15/442,221

(22) Filed: Feb. 24, 2017

(65) Prior Publication Data
US 2018/0245865 A1   Aug. 30, 2018

(51) Int. Cl.
*F28G 9/00* (2006.01)
*G01K 1/02* (2006.01)
(Continued)

(52) U.S. Cl.
CPC .............. *F28G 9/00* (2013.01); *F28G 13/005* (2013.01); *F28G 15/003* (2013.01); *G01B 7/06* (2013.01);
(Continued)

(58) Field of Classification Search
CPC .... G01N 17/008; G01N 33/2805; G01N 5/02; G01N 33/18; G01N 11/00; G01N 33/4905; G01N 25/18; G01B 7/06; G01B 21/085
(Continued)

(56) References Cited

U.S. PATENT DOCUMENTS 3,321,696 A * 5/1967 Abe .................. H01L 35/00
                                                363/140
3,724,267 A   4/1973 Zoschak
(Continued)

FOREIGN PATENT DOCUMENTS

CN  202013330 U   10/2011
FR  2788600 A1    7/2000
(Continued)

OTHER PUBLICATIONS

International Patent Application No. PCT/US2017/019439, International Search Report and Written Opinion dated Jun. 12, 2017, 12 pages.
(Continued)

*Primary Examiner* — John Fitzgerald
*Assistant Examiner* — Truong D Phan
(74) *Attorney, Agent, or Firm* — Fredrikson & Byron, P.A.

(57) ABSTRACT

Fluid flow systems can include one or more thermoelectric devices in contact with the fluid flowing through the system. One or more thermoelectric devices can be operated in a temperature control mode and a measurement mode. Thermal behavior of the one or more thermoelectric devices can be analyzed to characterize a level of deposit formed on the thermoelectric device(s) from the fluid flowing through the system. Characterizations of deposition on thermoelectric devices operated at different temperatures can be used to establish a temperature-dependent deposition profile. The deposition profile can be used to determine if depositions are likely to form at various locations in the system, such as at a use device or in a flow vessel. Detected deposit conditions can initiate one or more corrective actions that can be taken to remove deposits, or to prevent or minimize deposit formation before deposits negatively impact operation of the system.

11 Claims, 11 Drawing Sheets

(51) Int. Cl.
*G01K 7/02* (2006.01)
*F28G 13/00* (2006.01)
*G01B 7/06* (2006.01)
*G01K 13/02* (2006.01)
*F28G 15/00* (2006.01)
*G01K 7/16* (2006.01)

(52) U.S. Cl.
CPC .............. *G01K 1/024* (2013.01); *G01K 7/02* (2013.01); *G01K 7/021* (2013.01); *G01K 7/16* (2013.01); *G01K 13/02* (2013.01)

(58) Field of Classification Search
USPC .................. 73/61.62, 53.01; 374/7
See application file for complete search history.

(56) References Cited

U.S. PATENT DOCUMENTS

| | | | |
|---|---|---|---|
| 4,138,878 A * | 2/1979 | Holmes | G01N 25/18 374/7 |
| 4,346,587 A | 8/1982 | Brindak | |
| 4,383,438 A | 5/1983 | Eaton | |
| 4,514,096 A | 4/1985 | Wynnyckyj et al. | |
| 4,570,881 A * | 2/1986 | Lustenberger | B64D 15/20 244/134 F |
| 4,671,072 A | 6/1987 | Starck et al. | |
| 4,718,774 A | 1/1988 | Slough | |
| 4,722,610 A | 2/1988 | Levert et al. | |
| 4,832,715 A | 5/1989 | Naruse | |
| 4,967,593 A | 11/1990 | McQueen | |
| 5,248,198 A | 9/1993 | Droege | |
| 5,360,549 A | 11/1994 | Mouche | |
| 5,590,706 A | 1/1997 | Tsou et al. | |
| 5,661,233 A * | 8/1997 | Spates | G01N 11/00 166/250.01 |
| 5,827,952 A * | 10/1998 | Mansure | G01N 11/00 73/61.45 |
| 5,992,505 A | 11/1999 | Moon | |
| 6,053,032 A | 4/2000 | Kraus et al. | |
| 6,062,069 A | 5/2000 | Panchal et al. | |
| 6,250,140 B1 | 6/2001 | Kouznetsov et al. | |
| 6,328,467 B1 | 12/2001 | Keyhani | |
| 6,386,272 B1 | 5/2002 | Starner et al. | |
| 6,432,168 B2 | 8/2002 | Schonauer | |
| 6,499,876 B1 | 12/2002 | Baginksi et al. | |
| 6,666,905 B2 | 12/2003 | Page et al. | |
| 6,789,938 B2 | 9/2004 | Sandu et al. | |
| 6,886,393 B1 | 5/2005 | Romanet et al. | |
| 6,960,018 B2 | 11/2005 | Sandu et al. | |
| 7,077,563 B2 | 7/2006 | Xiao et al. | |
| 7,082,825 B2 | 8/2006 | Aoshima et al. | |
| 7,581,874 B2 | 9/2009 | Hays et al. | |
| 7,594,430 B2 | 9/2009 | Beardwood et al. | |
| 8,109,161 B2 | 2/2012 | Jovancicevic et al. | |
| 8,147,130 B2 | 4/2012 | Sakami et al. | |
| 8,274,655 B2 | 9/2012 | Herzog | |
| 8,360,635 B2 | 1/2013 | Huang et al. | |
| 8,517,600 B2 | 8/2013 | Wan et al. | |
| 8,672,537 B2 | 3/2014 | Veau et al. | |
| 8,746,968 B2 | 6/2014 | Auret et al. | |
| 9,151,204 B2 | 10/2015 | Hashida et al. | |
| 9,176,044 B2 | 11/2015 | Bosbach et al. | |
| 9,207,002 B2 | 12/2015 | Campbell et al. | |
| 9,506,883 B2 | 11/2016 | Takahashi et al. | |
| 9,939,395 B2 | 4/2018 | Wolferseder | |
| 2001/0013220 A1 | 8/2001 | Schonauer | |
| 2001/0035044 A1 | 11/2001 | Larsson et al. | |
| 2001/0051108 A1 | 12/2001 | Schonauer | |
| 2002/0111282 A1 | 8/2002 | Charaf et al. | |
| 2003/0062063 A1 | 4/2003 | Sandu et al. | |
| 2004/0052963 A1 * | 3/2004 | Ivanov | C23C 18/1619 427/443.1 |
| 2004/0139799 A1 | 7/2004 | Sudolcan et al. | |
| 2004/0144403 A1 | 7/2004 | Sandu et al. | |
| 2007/0025413 A1 * | 2/2007 | Hays | A61L 2/16 374/7 |
| 2007/0080075 A1 | 4/2007 | Wang et al. | |
| 2008/0190173 A1 | 8/2008 | Wienand et al. | |
| 2008/0264464 A1 * | 10/2008 | Lee | A61F 7/007 136/201 |
| 2008/0291965 A1 | 11/2008 | Wolferseder | |
| 2009/0000764 A1 | 1/2009 | Tochon et al. | |
| 2009/0094963 A1 | 4/2009 | Mizoguchi et al. | |
| 2009/0260987 A1 | 10/2009 | Valdes et al. | |
| 2010/0064769 A1 * | 3/2010 | Wang | G01N 27/407 73/23.31 |
| 2010/0084269 A1 | 4/2010 | Wang et al. | |
| 2010/0270620 A1 * | 10/2010 | Dibra | G01K 1/08 257/368 |
| 2010/0272993 A1 * | 10/2010 | Volinsky | B82Y 10/00 428/378 |
| 2011/0283773 A1 | 11/2011 | Suzuki | |
| 2011/0283780 A1 | 11/2011 | Bosbach et al. | |
| 2011/0286492 A1 | 11/2011 | Auret et al. | |
| 2011/0310927 A1 | 12/2011 | Bombardieri et al. | |
| 2013/0031973 A1 | 2/2013 | Kirst et al. | |
| 2013/0086923 A1 * | 4/2013 | Petrovski | H01L 35/00 62/3.61 |
| 2013/0144503 A1 | 6/2013 | Nishijima et al. | |
| 2013/0232956 A1 * | 9/2013 | Loman | F01N 3/206 60/274 |
| 2013/0256296 A1 | 10/2013 | Hocken et al. | |
| 2014/0346041 A1 | 11/2014 | Nishijima | |
| 2015/0023393 A1 | 1/2015 | Britton et al. | |
| 2015/0268078 A1 * | 9/2015 | Zhang | G01F 1/6884 374/45 |
| 2015/0308875 A1 | 10/2015 | Muller et al. | |
| 2015/0355076 A1 | 12/2015 | Eaton et al. | |
| 2016/0017780 A1 | 1/2016 | Kinugawa et al. | |
| 2016/0017830 A1 | 1/2016 | Wienand et al. | |
| 2016/0025801 A1 * | 1/2016 | Kim | G01J 5/0096 324/750.03 |
| 2016/0061691 A1 | 3/2016 | Stojicevic et al. | |
| 2017/0052133 A1 * | 2/2017 | Opdahl | G01N 21/553 |
| 2017/0138646 A1 * | 5/2017 | Ihnfeldt | F25B 21/00 |
| 2018/0073996 A1 | 3/2018 | Chattoraj et al. | |
| 2019/0162096 A1 * | 5/2019 | Hoehne | F01N 3/2066 |

FOREIGN PATENT DOCUMENTS

| | | |
|---|---|---|
| WO | 0043762 A1 | 7/2000 |
| WO | 0204290 A1 | 1/2002 |
| WO | 2009135504 A1 | 11/2009 |
| WO | 2010087724 A1 | 8/2010 |
| WO | 2013141438 A1 | 9/2013 |

OTHER PUBLICATIONS

"Introduction to the DATS Fouling Monitor Technology," Bridger Scientific Inc., 2011, 10 pages.

"Tomographic Applications for Oil & Gas Industry," Rocsole Ltd, 2014, 53 pages.

Awad "Influence of Surface Temperature on Surface Fouling-Theoretical Approach," Life Science Journal, vol. 9, No. 3, 2012, pp. 1733-1741.

Sincic et al., "Novel Fouling Measurement Device," Chemical and Biochemical Engineering Quarterly, vol. 28, No. 4, 2014, pp. 465-472.

* cited by examiner

THERMOELECTRIC DEPOSIT MONITOR

BACKGROUND

Various fluid flow systems are arranged to flow a process fluid from one or more input fluid sources toward a use device. For example, fluid flowing toward a heat exchanger surface can be used to transfer heat to or draw heat from the heat exchange surface and maintain the surface at an operating temperature.

In some examples, changes in the operating conditions of the fluid flow system, such as changes in the makeup of the fluid, operating temperatures of the fluid or the use device, or the like, can affect the likelihood of deposits forming from the process fluid onto system components. Deposits forming on the use device can negatively impact the performance of the device and/or the efficacy of the fluid for its intended purpose. For example, deposits forming on the heat exchange surface can act to insulate the heat exchange surface from the fluid, reducing the ability of the fluid to thermally interact with the heat exchanger. In another example, precipitates from a fluid depositing into a vessel (e.g., a pipe) during fluid transport can result in the precipitates not making it to the intended destination, and can cause buildup in the vessel that can restrict the fluid flow.

Often, such deposits are detected only when the performance of the use device or system degrades to the point of requiring attention. For example, a heat exchanger surface can become unable to maintain desired temperatures due to a sufficiently large deposit forming on a heat exchange surface thereof. In order to restore the system to working order, the system often must be shut down, disassembled, and cleaned, which can be a costly and time-consuming process.

SUMMARY

Certain aspects of the disclosure are generally directed to systems and methods for characterizing levels of deposits and/or detecting deposit conditions present in a fluid flow system. Some such systems can include one or more thermoelectric devices in thermal communication with a fluid flowing through the system. The thermoelectric device(s) can be in communication with a temperature control circuit that can provide electrical energy to the thermoelectric device(s) in order to adjust the temperature thereof. A measurement circuit can be configured to measure a signal representative of the temperature of each of the thermoelectric device(s). For instance, in some examples, the temperature of the thermoelectric device(s) can be determined using the Seebeck effect wherein the measurement circuit is capable of detecting the voltage across the thermoelectric device(s). In other examples, additional components, such as resistance temperature detectors (RTDs) can be placed in or approximately in thermal equilibrium with the thermoelectric device(s) in order to facilitate a temperature measurement thereof.

Systems can include a controller in communication with both the temperature control circuit and the measurement circuit. The controller can be arranged to apply electrical power to each of the thermoelectric device(s) to control the temperature thereof, and to determine a temperature of each of the thermoelectric device(s) via the measurement circuit. In some such systems, the controller is configured apply electrical power to one or more thermoelectric devices to maintain each of the thermoelectric devices at a characterization temperature. In some example, at least one thermoelectric device is maintained at a characterization temperature that is lower than an operating temperature of a use device for use with the system.

In some systems, the controller can, for each of the one or more thermoelectric devices, periodically measure the temperature of the thermoelectric device, observe changes in the thermal behavior of the thermoelectric device, and characterize a level of deposit onto the thermoelectric device based on the observed changes. Such characterization can be performed, for example, based on changes in the thermal behavior over time as deposits may accumulate at the thermoelectric device. In some embodiments, the controller can be configured to determine if a deposit condition exists for the use device based on the characterized level(s) of deposits at the thermoelectric device(s).

In various embodiments, observing changes in the behavior of an thermoelectric device can include a variety of observations. Exemplary observations can include changes in the temperature achieved by the thermoelectric device when a constant power is applied thereto, changes in the rate of temperature change of the thermoelectric device, amount of electrical power applied in the temperature control mode of operation to achieve a certain temperature, and the like. Such characteristics can be affected by deposits forming on the thermoelectric device from the fluid, and can be used to characterize the level of deposit on the thermoelectric device.

In some examples, the controller can be capable of initiating one or more corrective actions to address detected deposits and/or deposit conditions. For example, changes to the fluid flowing through the system can be adjusted to minimize the formation of deposits. Such changes can include adding one or more chemicals, such as dispersants or surfactants, to reduce deposit formation, or stopping the flow of certain fluids into the system that may be contributing to deposit formation. Other corrective actions can include changing system parameters, such as fluid or use device operating temperatures.

In some embodiments, such corrective actions can be performed manually by a system operator. For instance, in some such examples, the controller can, based on analysis of the thermal behavior of one or more thermoelectric devices, indicate a possible deposit condition to a user, who perform one or more manual tasks to address the deposit condition. Additionally or alternatively, such actions can be automated, for example, via the controller and other equipment, such as one or more pumps, valves, or the like.

DETAILED DESCRIPTION

Thermoelectric devices are devices capable of changing temperature in response to an electrical signal and/or produce an electrical signal based on the temperature of the device. Such devices can be used to measure and/or change the temperature of the device itself or an object in close proximity with the device. For example, in some instances, a voltage output from the thermoelectric device can be indicative of the temperature of the thermoelectric device, for example, via the Seebeck effect. Thus, the voltage across the thermoelectric device can be measured to determine the temperature of the thermoelectric device.

A current flowing through the thermoelectric device can be used to affect the temperature of the thermoelectric device. For instance, in some thermoelectric devices, a current flowing through the device will increase or decrease the temperature of the device based on the direction of current flow. That is, the device can be heated when current flows through the device in a first direction, and cooled when the current flows through the device in the opposite direction. Thus, via different modes of operation, the temperature of some thermoelectric devices can be adjusted by applying electrical power to the device to cause a current to flow therethrough and also measured by measuring the voltage drop across the device. Exemplary thermoelectric devices include, but are not limited to, Peltier devices, thermoelectric coolers, and the like. In some examples, a plurality of thermoelectric devices can be arranged in series to increase the temperature difference achievable by the thermoelectric devices. For instance, if a particular thermoelectric device can achieve a temperature difference of 10° C. between two surfaces, two such thermoelectric devices arranged in series can achieve a temperature difference of 20° C. between surfaces. In general, thermoelectric devices as referred to herein can include a single thermoelectric device or a plurality of thermoelectric devices operating in a stacked arrangement to increase the temperature differences achievable by the devices.

Figure 1:
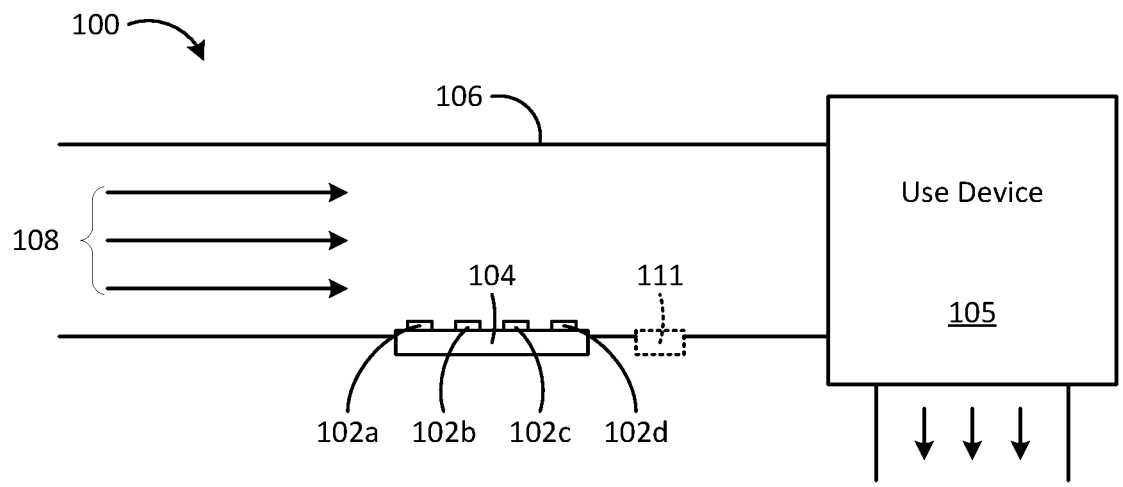
FIG. 1 is an illustration of an exemplary placement of one or more thermoelectric devices in a fluid flow system.

FIG. 1 is an illustration of an exemplary placement of one or more thermoelectric devices in a fluid flow system. As shown, thermoelectric devices 102a-d are positioned in the flow path 106 of a process fluid in a fluid flow system 100 configured to direct a process fluid to a use device 105. Arrows 108 illustrate an exemplary flow path of fluid from a fluid source toward the use device 105. As described herein process fluids can generally relate to any fluids flowing through such a fluid flow system, including but not limited to utility fluids such as cooling water, boiler feed water, condensate, blowdown water, waste water, discharged effluent water, oils, and oil-water mixtures. Such exemplary process fluids can be directed into the fluid flow system 100 from a variety of sources (e.g., an effluent stream from a process, boiler blowdown water, treated waste water, produced water, a fresh water source, etc.). In some examples, a single fluid flow system 100 can receive input process fluids from a variety of sources. In some such examples, the source of process fluid can be selected, such as via a manual and/or automated valve or series of valves. In some embodiments, a single fluid source can be selected from one or more possible input sources. In alternative embodiments, a plurality of fluid sources can be selected such that fluid from the selected plurality of sources is mixed to form the input fluid. In some implementations, a default input fluid is made up of a mixture of fluids from each of the plurality of available input sources, and the makeup of the input fluid can be adjusted by blocking the flow of one or more such input sources into the system.

In the example of FIG. 1, thermoelectric devices 102a-d are shown as an array of thermoelectric devices mounted on a sample holder 104. In some examples, sample holder 104 is removable from the flow path 106 of the fluid flow system 100, for example, to facilitate cleaning, replacing, or other maintenance of thermoelectric devices 102a-d. Additionally or alternatively, one or more thermoelectric devices (e.g. positioned on a sample holder) can be positioned in the flow path of one or more fluid inputs that contribute to the makeup of the fluid flowing through the fluid flow system 100 to the use device 105. The fluid flow system can be any system in which a process fluid flows, including for example, washing systems (e.g., warewashing, laundry, etc.), food and beverage systems, mining, energy systems (e.g., oil wells, refineries, pipelines—both upstream and downstream, produced water coolers, chillers, etc.), air flow through engine air intakes, heat exchange systems such as cooling towers or boilers, pulp and paper processes, and others. Arrows 108 indicate the direction of flow of the fluid past the thermoelectric devices 102, which can be used to monitor the temperature of the fluid (e.g., via the Seebeck effect), and toward the use device 105.

In some embodiments, a fluid flow system comprises one or more additional sensors 111 (shown in phantom) capable of determining one or more parameters of the fluid flowing through the system. In various embodiments, one or more additional sensors 111 can be configured to determine flow rate, temperature, pH, alkalinity, conductivity, and/or other fluid parameters, such as the concentration of one or more constituents of the process fluid. While shown as being a single element positioned downstream of the thermoelectric devices 102a-d, one or more additional sensors 111 can include any number of individual components, and may be positioned anywhere in the fluid flow system 100 while sampling the same fluid as thermoelectric devices 102a-d.

Figure 2:
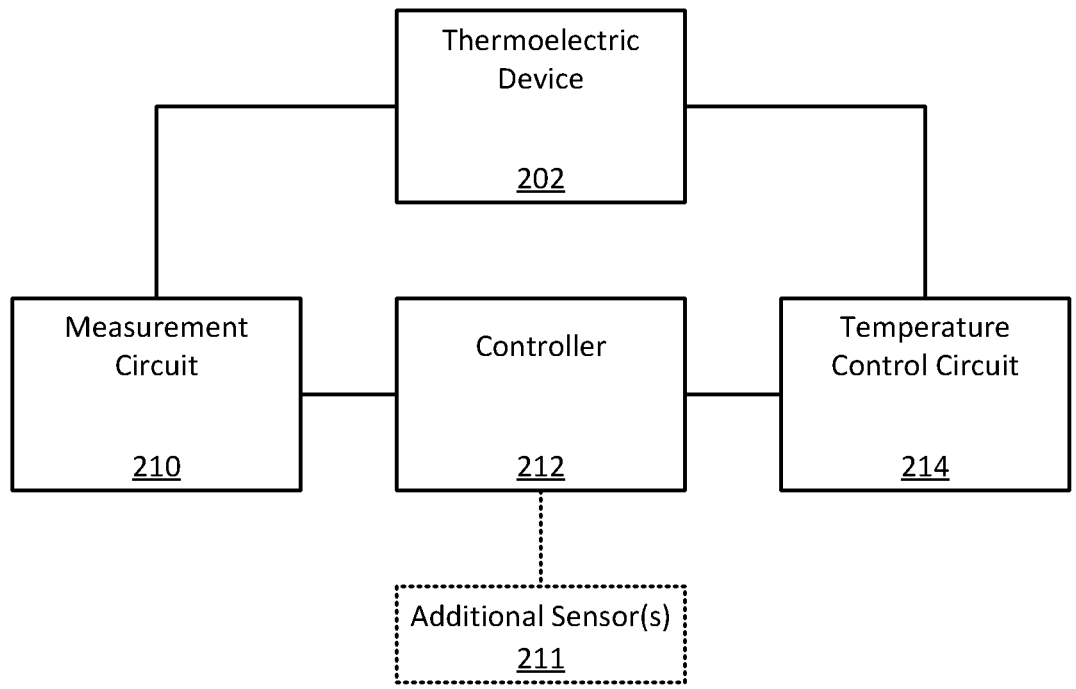
FIG. 2 is a schematic diagram of a system for operating a thermoelectric device in an exemplary embodiment.

FIG. 2 is a schematic diagram of a system for operating a thermoelectric device in an exemplary embodiment. In the embodiment of FIG. 2, a thermoelectric device 202 is in communication with a measurement circuit 210 configured to measure the temperature of the thermoelectric device 202. In some examples, the measurement circuit 210 can facilitate the measurement of the voltage across the thermoelectric device in order to determine the temperature thereof. In an exemplary embodiment, the measurement circuit can include a reference voltage (e.g., a ground potential, a precision voltage source, a precision current source providing a current through a sense resistor, etc.) and a differential amplifier. In some such embodiments, the voltage across the thermoelectric device and the reference voltage can be input to the amplifier, and the output of the amplifier can be used to determine the voltage drop across the thermoelectric device. In some examples, measurement circuit 210 can include voltage sensing technology, such as a volt meter or the like.

Additionally or alternatively, in some embodiments, the measurement circuit can include additional components for observing the temperature of thermoelectric device 202. For example, in some embodiments, the measurement circuit 210 can include a temperature sensors such as resistance temperature detector (RTD) positioned proximate or in thermal contact with the thermoelectric device 202. The resistance of an RTD varies with its temperature. Accordingly, in some such examples, the measurement circuit 210 includes one or more RTDs and circuitry for determining the resistance of the RTD in order to determine the temperature thereof.

The system can include a controller 212 in communication with the measurement circuit 210. The controller 212 can include a microcontroller, a processor, memory comprising operating/execution instructions, a field programmable gate array (FPGA), an application-specific integrated circuit (ASIC), and/or any other device capable of interfacing and interacting with system components. For example, the controller 212 can be capable of receiving one or more inputs and generating one or more outputs based on the received one or more inputs. In various examples, the outputs can be generated based on a set of rules implemented according to instructions programmed in memory (e.g., executable by one or more processors), pre-programmed according an arrangement of components (e.g., as in an ASIC), or the like.

In some such examples, the system can operate in a measurement mode in which the controller 212 can interface with the measurement circuit 210 for determining a temperature of the thermoelectric device 202. In some examples, the controller can initiate a measurement of the voltage across the thermoelectric device via the measurement circuit 210, receive a signal from the measurement circuit 210 representative of the voltage across the thermoelectric device 202, and determine the temperature of the thermoelectric device based on the measured voltage (e.g., via the Seebeck effect). Additionally or alternatively, the controller 212 can include an input capable of receiving a voltage signal relative to a reference signal. In some such examples, the controller 212 can directly interface with the thermoelectric device 202 for determining the voltage thereacross. That is, in some examples, the functionality of the measurement circuit 210 can be integrated into the controller 212. Thus, in various embodiments, the controller 212 can interface with the measurement circuit 210 and/or the thermoelectric device 202 to determine the temperature of the thermoelectric device 202.

The system of FIG. 2 further comprises a temperature control circuit 214 in communication with the controller 212 and the thermoelectric device 202. In some examples, system can operate in a temperature control mode in which the controller 212 can apply electrical power to the thermoelectric device 202 via the temperature control circuit 214 in order to adjust the temperature of the thermoelectric device 202. For example, the temperature control circuit 214 can apply electrical power to the thermoelectric device 202 to cause a current to flow through the device 202 in a first direction in order to increase the temperature of the thermoelectric device 202. Similarly, the temperature control circuit 214 can apply electrical power to the thermoelectric device 202 to cause a current to flow through the device 202 in a second direction, opposite the first, in order to decrease the temperature of the thermoelectric device. Thus, in some embodiments, the temperature control mode can include a heating mode and a cooling mode, and the difference between the heating and cooling modes is the direction current flows through the thermoelectric device 202. In some embodiments, the temperature control circuit 214 can be configured to provide electrical power in either polarity with respect to a reference potential, thereby enabling both heating and cooling operation of the thermoelectric device 202. Additionally or alternatively, the temperature control circuit 214 can include a switch configured to switch the polarity of the thermoelectric device 202 in order to facilitate switching between heating and cooling modes of operation.

In some such embodiments, the controller 212 is capable of adjusting or otherwise controlling an amount of power applied to the thermoelectric device 202 in order to adjust the current flowing through, and thus the temperature of, the thermoelectric device 202. In various examples, adjusting the applied power can include adjusting a current, a voltage, a duty cycle of a pulse-width modulated (PWM) signal, or other known methods for adjusting the power applied to the thermoelectric device 202.

In some examples, the controller 212 is capable of interfacing with the thermoelectric device 202 via the temperature control circuit 214 and the measurement circuit 210 simultaneously. In some such examples, the system can simultaneously operate in temperature control mode and measurement mode. Similarly, such systems can operate in the temperature control mode and in the measurement mode independently, wherein the thermoelectric device may be operated in the temperature control mode, the measurement mode, or both simultaneously. In other examples, the controller 212 can switch between a temperature control mode and a measurement mode of operation. Additionally or alternatively, a controller in communication with a plurality of thermoelectric devices 202 via one or more measurement circuits 210 and one or more temperature control circuits 214 can operate such thermoelectric devices in different modes of operation. In various such examples, the controller 212 can operate each thermoelectric device in the same mode of operation or separate modes of operation, and/or may operate each thermoelectric device individually, for example, in a sequence. Many implementations are possible and within the scope of the present disclosure.

As described with respect to FIG. 1, the system can include one or more additional sensors 211 for determining one or more parameters of the fluid flowing through the fluid flow system. Such additional sensors 211 can be in wired or wireless communication with the controller 212. Thus, in some embodiments, the controller 212 can be configured to interface with both thermoelectric devices 202 and additional sensors 211 positioned within the fluid flow system.

Figure 3A:
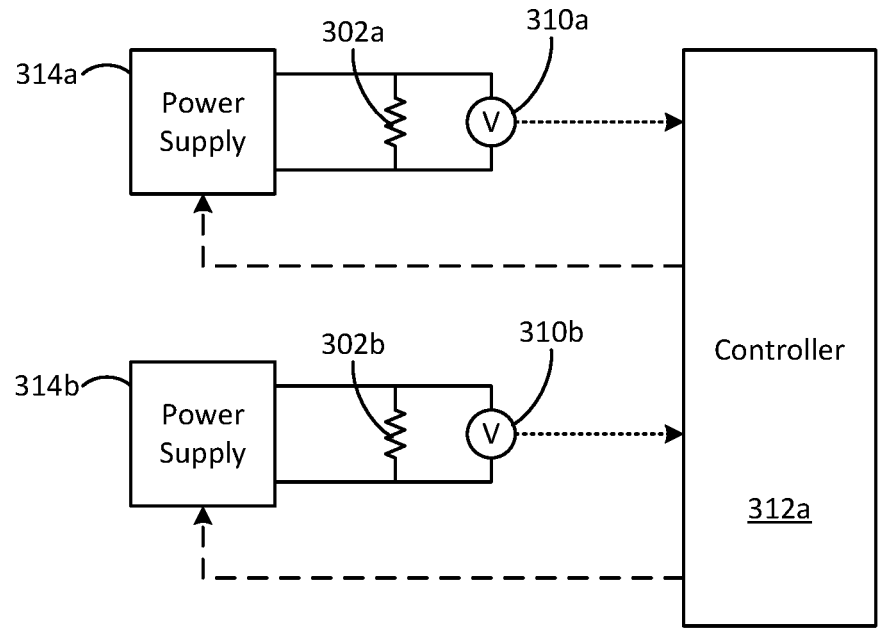
FIGS. 3A and 3B show simplified electrical schematic diagrams for operating a plurality of thermoelectric devices.
Figure 3B:
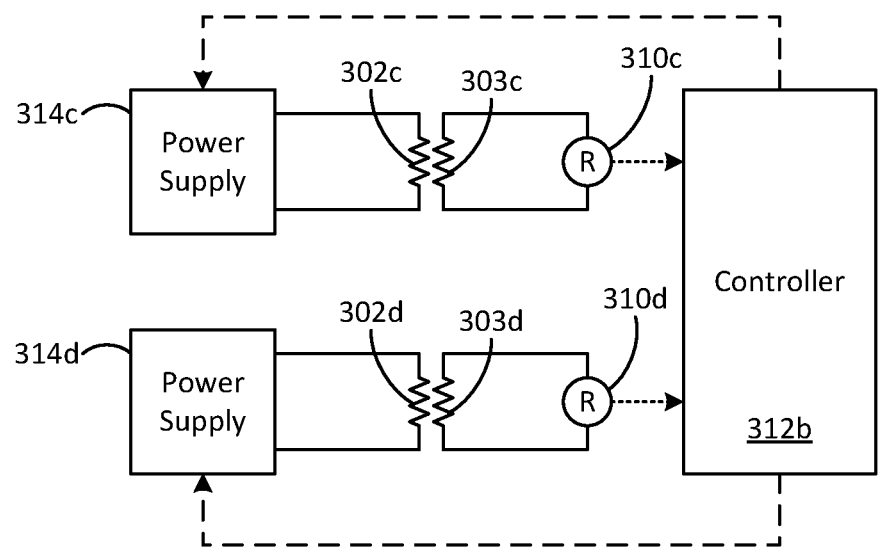

FIGS. 3A and 3B show simplified electrical schematic diagrams for operating a plurality of thermoelectric devices. FIG. 3A shows a pair of thermoelectric devices 302a and 302b in communication with power supplies 314a and 314b, respectively. Power supplies 314a and 314b can be included in a temperature control circuit for controlling the temperatures of thermoelectric devices 302a and 302b, respectively. In some instances, each power supply 314a, 314b can be configured to apply electrical power to its corresponding thermoelectric device 302a, 302b. As described elsewhere herein, in some examples, the a power supply (e.g., 314a) can provide electrical power in either polarity to a thermoelectric device (e.g., 302a) in order to cause current to flow through the thermoelectric device in either direction. Power supplies 314a and 314b can be configured to provide electrical power to thermoelectric devices 302a and 302b, respectively, in order to change the temperature thereof. In some embodiments, power supplies 314a and 314b are separate power supplies. In other examples, power supplies 314a and 314b can be the same power supply, for example, including different output channels for separately providing power to thermoelectric devices 302a and 302b.

In the illustrated example of FIG. 3A, thermoelectric devices 302a and 302b are in communication with meters 310a and 310b, respectively. Each meter can be configured to facilitate a measurement of the voltage across its corresponding thermoelectric device 302a, 302b, such as via controller 312a. In the illustrated example, controller 312a is in communication with both meters 310a and 310b. In some examples, the controller 312a can determine the voltage drop across thermoelectric devices 302a and 302b via meters 310a and 310b, respectively. In some such examples, the controller can determine the temperature of each of thermoelectric devices 302a, 302b based on the voltage thereacross via the Seebeck effect.

According to the schematic representation of FIG. 3A, the controller 312a is in communication with power supplies 314a and 314b. The controller 312a can be configured to control operation of the power supplies 314a and 314b based on the determined temperatures of the thermoelectric devices 302a and 302b, respectively. In some examples, the controller 312a can both measure the temperature of a thermoelectric device and control the power supply associated with the thermoelectric device simultaneously. In other examples, the controller 312a stops the power supply 314a, 314b from applying electrical power to the respective thermoelectric device 302a, 302b in order to measure the temperature thereof, for example, via the Seebeck effect using meters 310a, 310b. Using such feedback control, the temperature of a plurality of thermoelectric devices (e.g., 302a and 302b) can be both measured and controlled via controller 312a.

FIG. 3B similarly shows a pair of thermoelectric devices 302c and 302d in communication with power supplies 314c and 314d, respectively. Power supplies 314c and 314d can be configured to interface with thermoelectric devices 302c and 302d as described with respect to FIG. 3A. The schematic illustration of FIG. 3B includes RTDs 303c and 303d positioned proximate thermoelectric devices 302c and 302d, respectively. Each RTD 303c, 303d can be positioned sufficiently close to its corresponding thermoelectric device that each RTD is approximately in thermal equilibrium with its corresponding thermoelectric device, even as the temperature of the thermoelectric device changes.

Meters 310c and 310d can be configured to facilitate measurements of the resistance of RTDs 303a and 303b, respectively, by controller 312b. Resistance values of RTDs 303c, 303d can be used to determine the temperature of RTDs 303c, 303d, and because the RTDs 303c, 303d are in thermal equilibrium with thermoelectric devices 302c, 302d, can be used to determine the temperature of thermoelectric devices 302c and 302d. Similar to the embodiment of FIG. 3A, controller 312b in FIG. 3B can be used to control power supplies 314c, 314d in order to adjust the power applied to, and therefore the temperature of, thermoelectric devices 302c, 302d.

Figure 4A:
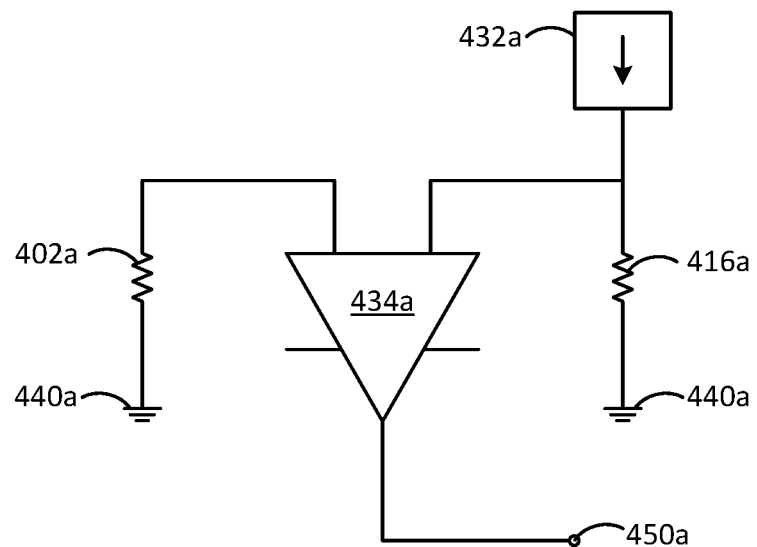
FIGS. 4A and 4B are schematic diagrams showing operation of single thermoelectric devices in a measurement mode of operation.
Figure 4B:
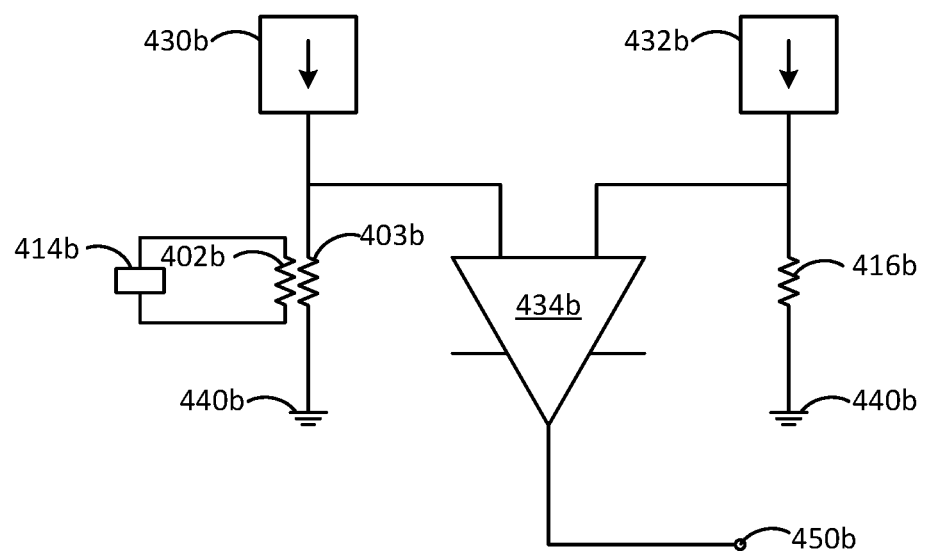

FIGS. 4A and 4B are schematic diagrams showing operation of single thermoelectric devices in a measurement mode of operation. In the illustrated embodiment of FIG. 4A, thermoelectric device 402a is coupled between ground 440a and a first input of an amplifier 434a. Thus, the voltage drop across the thermoelectric device 402a (e.g., corresponding to the temperature of the thermoelectric device 402a based on the Seebeck effect) is applied to the first input of the amplifier 434a.

A current source 432a is configured to provide a constant current flow through a reference resistor 416a to ground 440a. Current source 432a can be configured to provide a known current from the current source 432a through reference resistor 416a to ground. Because the current from current source 432a and the resistance of the reference resistor 416a are known, these values can be used to determine the voltage drop across the reference resistor 416a, which is applied at a second input of the amplifier 434a. Because this voltage drop is dependent on known values (i.e., the current from current source 432a and the resistance of reference resistor 416a), the voltage applied to the second input of the amplifier 434a functions as a reference voltage to which the voltage applied at the first input (the voltage drop across thermoelectric device 402a) is compared. In some examples, reference resistor 416a and/or current source 432a may be omitted so that the second input of the amplifier 434a is ground 440a.

The output 450a of the amplifier 434a can provide information regarding the difference between the known voltage drop across the reference resistor 416a and the voltage drop across the thermoelectric device 402a, which can be used to determine the voltage drop across the thermoelectric device 402a. Thus, in some examples, the configuration shown in FIG. 4A can be used to function as meter 310a or 310b in FIG. 3A for measuring the voltage across a thermoelectric device.

As described elsewhere herein, the determined voltage drop across the thermoelectric device 402a can be used to determine the temperature of the thermoelectric device 402a, for example, using the Seebeck effect. While not shown in the embodiment of FIG. 4A, in some instances, the thermoelectric device 402a is a single thermoelectric device selected from an array of thermoelectric devices, for example, via the operation of a switch selectively coupling a thermoelectric device from an array of thermoelectric devices.

In the exemplary configuration of FIG. 4B, thermoelectric device 402b is in communication with a temperature control circuit 414b, which can be configured to provide electrical power to thermoelectric device 402b in order to affect the temperature thereof. As described elsewhere herein, in some examples, temperature control circuit 414b can be configured to provide power in either polarity to thermoelectric device 402b to effect temperature change of the thermoelectric device 402b in either direction.

In the illustrated example, an RTD 403b is positioned proximate the thermoelectric device 402b so that changes in the temperature of the thermoelectric device 402b are detectable by the RTD 403b. A current source 430b is configured to provide a known current through RTD 403b to ground 440b. The known current from current source 430b can be sufficiently small so as to not meaningfully affect the temperature of the RTD 403b through which the current flows. The current from current source 430b causes a voltage drop across the RTD 403b, which is applied to a first input of amplifier 434b.

Current source 432b is configured to provide a constant current flow through a reference resistor 416b to ground 440b. As described elsewhere herein, the known current from the current source 432b and the known resistance of the reference resistor 416b can be used to determine the voltage drop across the reference resistor 416b, which is applied at a second input of the amplifier 434b. As described with reference to FIG. 4A, because it is calculated from known values, the voltage drop applied to the second input of amplifier 434b can function as a reference voltage to which the voltage drop across RTD 403b can be compared. In some examples, current source 432b and/or reference resistor 416b can be eliminated so that the second input to the amplifier 434b is effectively grounded.

The output 450b of the amplifier 434b can provide information regarding the difference between the known voltage drop across the reference resistor 416b and the voltage drop across the RTD 403b, which can be used to determine the voltage drop across the RTD 403b. The voltage drop across the RTD 403b can be used to determine the resistance of the RTD 403b based on the known current from current source 430b. Thus, in some embodiments, the configuration shown in FIG. 4B can be used as resistance meter 310c or 310d in FIG. 3B. The determined resistance of the RTD 403b can be used to determine the temperature of the RTD 403b and thus the temperature of the thermoelectric device 402b proximate the RTD 403b.

Figure 5A:
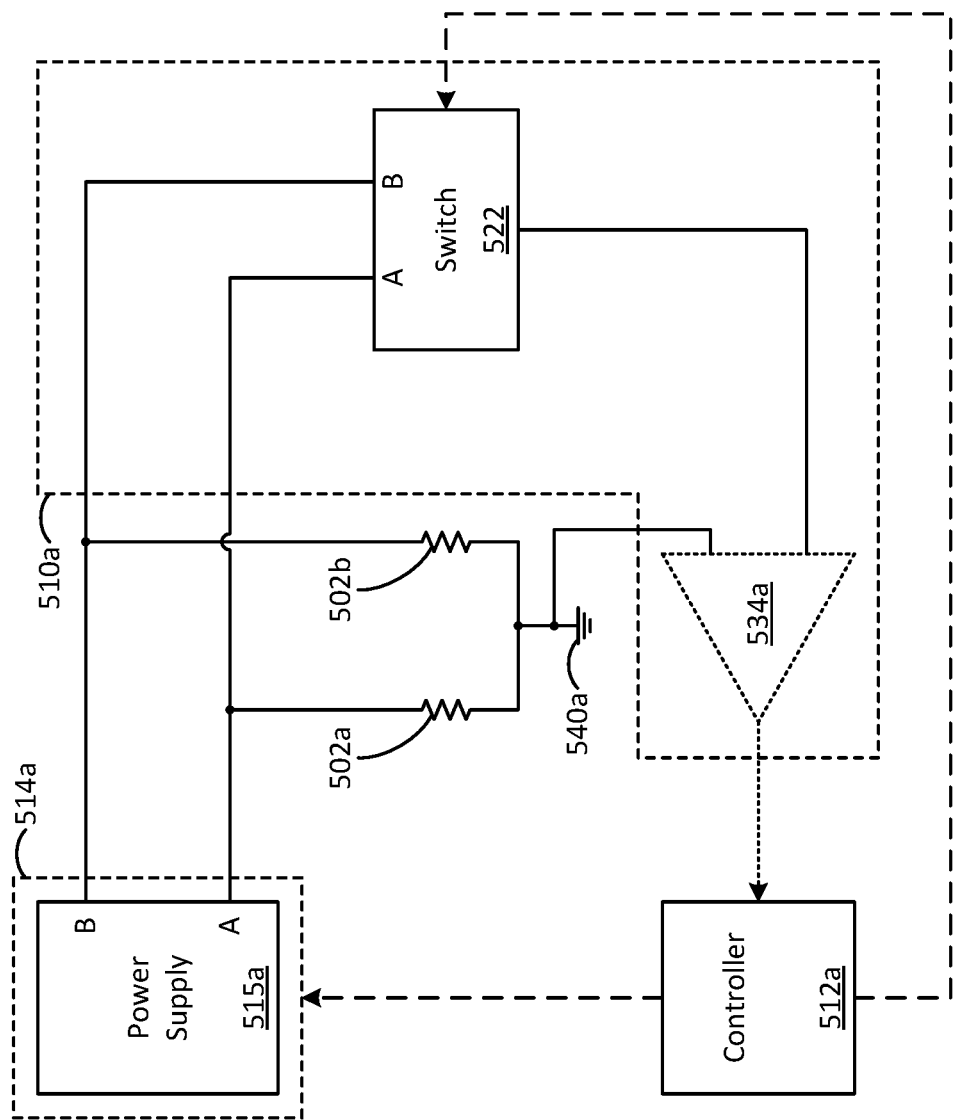
FIGS. 5A and 5B show exemplary configurations for operation of a plurality of thermoelectric devices in a system.
Figure 5B:
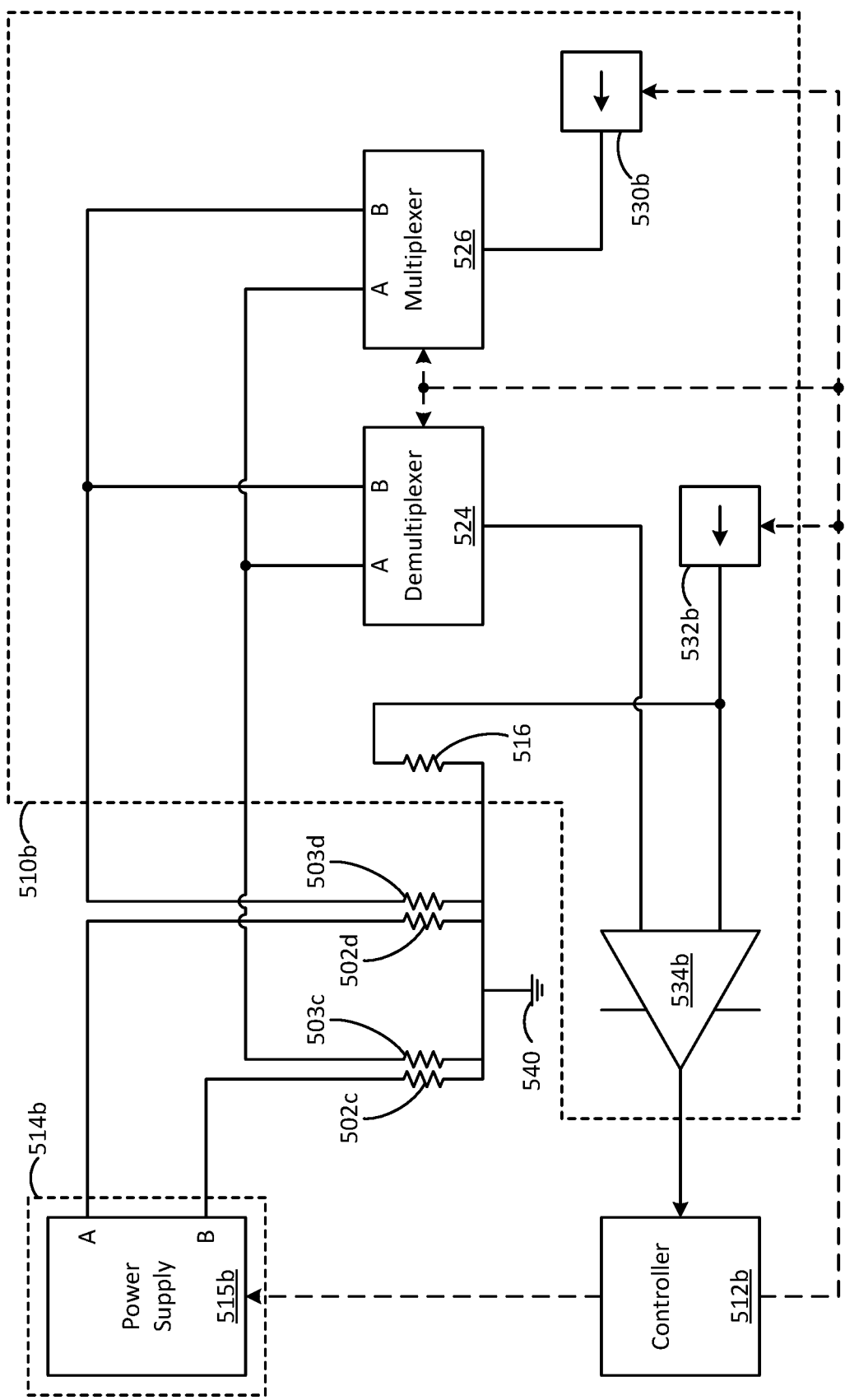

As described elsewhere herein, in some examples, a system can include a plurality of thermoelectric devices that can be selectively heated and/or cooled in a temperature control mode. The temperatures of each of the plurality of thermoelectric devices can be measured, for example, in a measurement mode of operation. In some examples, each of the plurality of thermoelectric devices can be heated and/or cooled simultaneously and/or individually. Similarly, in various examples, the temperatures of each of the thermoelectric devices can be measured simultaneously and/or individually. FIGS. 5A and 5B show exemplary configurations for operation of a plurality of thermoelectric devices in a system.

FIG. 5A is an exemplary schematic diagram showing an operational configuration of an array of thermoelectric devices. In the illustrated embodiment, thermoelectric devices 502a and 502b are in communication with a controller 512a via a measurement circuit 510a and a temperature control circuit 514a, for example, power supply 515a. In some examples, power supply 515a can provide electrical power to thermoelectric devices 502a and 502b. In some such examples, the power supply 515a can provide power at either polarity. Additionally or alternatively, the temperature control circuit 514a can include a switch (not shown) to facilitate changing the polarity of electrical power provided from the power supply 515a to the thermoelectric devices 502a, 502b.

During a temperature control mode of operation, the controller 512a can cause the temperature control circuit 514a to provide electrical power to one or more of the thermoelectric devices 502a, 502b to adjust the temperature of the thermoelectric device. In the example of FIG. 5A, the power supply 515a includes a pair of channels A and B, each channel corresponding to a respective thermoelectric device 502a and 502b in the pair of thermoelectric devices. Each channel of the power supply 515a is in communication with its corresponding thermoelectric device 502a, 502b. In some examples, an amplification stage (not shown) can be configured to modify the signal from the power supply 515a to generate a signal applied to the respective thermoelectric device 502a, 502b. For instance, in some examples, an amplification stage is configured to filter a PWM signal from the power supply 515a, for example, via an LRC filter, in order to provide a steady power to the thermoelectric device 502a. Additionally or alternatively, an amplification stage can effectively amplify a signal from the power supply 515a for desirably changing the temperature of the thermoelectric device 502a.

As discussed elsewhere herein, in some embodiments, the temperature control circuit 514a can operate in heating and cooling modes of operation. In some examples, the temperature control circuit 514a is capable of providing electrical power in either polarity with respect to ground 540a. In some such examples, current can flow from the temperature control circuit 514a to ground 540a or from ground to the temperature control circuit 514a through one or more of thermoelectric devices 502a, 502b depending on the polarity of the applied power. Additionally or alternatively, the temperature control circuit can include one or more switching elements (not shown) configured to reverse the polarity of the power applied to one or more of thermoelectric devices 502a, 502b. For example, in some such embodiments, power supply 515a can be used to establish a magnitude of electrical power (e.g., a magnitude of current) to apply to one or more thermoelectric devices 502a, 502b. The one or more switching elements can be used to adjust the polarity in which the electrical power is applied to the thermoelectric devices 502a, 502b (e.g., the direction of current flow therethrough).

In an exemplary temperature control operation, the controller signals the power supply 515a to adjust (e.g., reduce) the temperature of a thermoelectric device 502a. The controller 512a can cause the power supply 515a to output and electrical signal from channel A toward thermoelectric device 502a. Aspects of the electrical signal, such as the duty cycle, magnitude, etc. can be adjusted by the controller 512a to meet desired temperature adjustment (e.g., cooling) effects. Similar temperature adjustment (e.g., cooling) operations can be performed for any or all of thermoelectric devices 502a, 502b simultaneously. In some embodiments, the controller 512a can control temperature adjustment (e.g., cooling) operation of each of a plurality of thermoelectric devices 502a, 502b such that each of the thermoelectric devices is set (e.g., cooled) to a different operating temperature.

As described elsewhere herein, the controller 512a can be capable of interfacing with one or more thermoelectric devices 502a, 502b via a measurement circuit 510a. In some such examples, the controller 512a can determine, via the measurement circuit 510a, a measurement of the temperature of the thermoelectric device 502a, 502b. Since the voltage across a thermoelectric device is dependent on the temperature thereof, in some examples, the controller 512a can be configured to determine the voltage across the thermoelectric device 502a, 502b and determine the temperature therefrom, for example, via the Seebeck effect.

In order to measure the voltage drop across a desired one of the plurality of thermoelectric devices 502a, 502b, the measurement circuit 510a includes a switch 522 having channels A and B corresponding to thermoelectric devices 502a and 502b, respectively. The controller 512a can direct the switch 522 to transmit a signal from any one of respective channels A and B depending on the desired thermoelectric device. The output of the switch 522 can be directed to the controller 512a for receiving the signal indicative of the voltage across, and therefore the temperature of, a desired thermoelectric device. For example, in some embodiments, the output of the switch 522 does not connect to or otherwise has high impedance to ground. Accordingly, current flowing through a thermoelectric device (e.g., 502a) will only flow through the thermoelectric device to ground 540a, and not through the switch 522.

The voltage across the thermoelectric device (e.g., 502a) will be present at the respective input channel (e.g., channel A) of the switch 522 with respect to ground 540a, and can be output therefrom for receiving by the controller 512a. In some examples, instead of being directly applied to controller 512a, the voltage across the thermoelectric device (e.g., 502a) at the output of the switch 522 can be applied to a first input of a differential amplifier 534a for measuring the voltage. The amplifier 534a can be used, for example, to compare the voltage at the output of the switch 522 to a reference voltage (e.g., ground 540a) before outputting the resulting amplified signal to the controller 512a. Thus, as described herein, a signal output from the switch 522 for receiving by the controller 512a can, but need not be received directly by the controller 512a. Rather, in some embodiments, the controller 512a can receive a signal based on the signal at the output of the switch 522, such as an output signal from the amplifier 534a based on the output signal from the switch 522 with respect to ground 540a.

In some embodiments, the controller 512a can operate the switch 522 so that a desired thermoelectric device is being analyzed. For instance, with respect to the illustrative example of FIG. 5A, the controller 512a can operate the switch 522 on channel A so that the voltage present at the differential amplifier 534a is the voltage across the thermoelectric device 502a via the switch 522.

In an exemplary configuration such as shown in FIG. 5A, in which a plurality of thermoelectric devices 502a, 502b are in communication with different channels of the switch 522, the controller 512a can act to switch operating channels of the switch 522 in order to perform temperature measurements of each of the thermoelectric devices 502a, 502b. For instance, in an exemplary embodiment, the controller can cycle through respective switch 522 channels in order to perform temperature measurements of each of the respective thermoelectric devices 502a, 502b.

As described elsewhere herein, in some examples, the controller 512a can control the temperature adjustment operation of one or more thermoelectric devices. In some such embodiments, the controller 512a stops adjusting the temperature of a thermoelectric device prior to measuring the temperature of the thermoelectric device via the switch 522. Similarly, when adjusting the temperature of a thermoelectric device via the temperature control circuit 514a, the controller 512a can turn off the channel(s) associated with that thermoelectric device in the switch 522. In some embodiments, for each individual thermoelectric device, the controller 512a can use the temperature control circuit 514a and the measurement circuit 510a (including switch 522) to switch between temperature adjustment and measurement modes of operation.

In some embodiments, the controller 512a can have a plurality of inputs for receiving signals associated with a plurality of thermoelectric devices (e.g., 502a, 502b) simultaneously. For example, in some embodiments, switch 522 can include a plurality of outputs (e.g., a double pole, single throw switch or a double pole, double throw switch) for selectively coupling one or more thermoelectric devices (e.g., 502a, 502b) to the controller 512a. In some such systems, a plurality of differential amplifiers (e.g., 534) can be used to amplify each output signal from the switch 522 with respect to ground for communicating to controller 512a. In other examples, the controller 512a may directly interface with a plurality of thermoelectric devices (e.g., 502a, 502b) simultaneously via a plurality of inputs. In some such examples, switch 522 and/or amplifier 534a may be absent.

As mentioned elsewhere herein, in some embodiments, a measurement circuit (e.g., 510) can include additional components for measuring the temperature of the thermoelectric devices 502c, 502d. FIG. 5B is an exemplary schematic diagram showing an operational configuration of an array of thermoelectric devices including additional temperature measurement devices. The exemplary embodiment of FIG. 5B comprises thermoelectric devices 502c, 502d and associated RTDs 503c, 503d, respectively, such as shown in FIG. 5B. Operation (e.g., heating and/or cooling) of the thermoelectric devices 502c, 502d may be performed via the temperature control circuit 514b (e.g., including power supply 515b) similar to described above with respect to temperature control circuit 514a and power supply 515a in FIG. 5A.

The measurement circuit 510b can include RTDs 503c, 503d associated with thermoelectric devices 502c and 502d, respectively. In some such examples, RTDs 503c, 503d are positioned near enough to their corresponding thermoelectric devices 502c, 502d, so that each RTD 503c, 503d is in or near thermal equilibrium with its corresponding thermoelectric device 502c, 502d. Thus, resistance values of the RTDs 503c, 503d can be used to determine the temperature of the thermoelectric devices 502c, 502d, for instance, by determining the resistance of each RTD 503c, 503d.

In some embodiments, the controller 512b can be capable of interfacing with one or more RTDs 503c, 503d via other components in the measurement circuit 510b. In some such examples, the controller 512b can determine, via components in the measurement circuit 510b, a measurement of the temperature of the RTD 503c, 503d (and therefore the temperature of thermoelectric devices 502c, 502d). Since the resistance of an RTD is dependent on the temperature thereof, in some examples, the controller 512b can be configured to determine the resistance of the RTDs 503c, 503d and determine the temperature of RTDs 503c, 503d therefrom. In the illustrated embodiment, the measurement circuit 510b comprises a current source 530b (e.g., a precision current source) capable of providing a desired current through one or more of the RTDs 503c, 503d to ground 540b. In such an embodiment, a measurement of the voltage across the RTD 503c, 503d can be combined with the known precision current flowing therethrough to calculate the resistance, and thus the temperature, of the RTD 503c, 503d. In some examples, the current provided to the RTDs from the current source 530b is sufficiently small (e.g., in the microamp range) so that the current flowing through the RTD does not substantially change the temperature of the RTD or the temperature of the associated thermoelectric device.

In configurations including a plurality of RTDs, such as RTDs 503c and 503d, the controller 512b can interface with each of the RTDs 503c, 503d in a variety of ways. In the exemplary embodiment of FIG. 5B, the measurement circuit 510b comprises a multiplexer 524 in communication with the controller 512b, the current source 530b and the RTDs 503c, 503d. The controller 512b can operate the multiplexer 524 so that, when a measurement of the voltage across one of the RTDs (e.g., 503c) is desired, the multiplexer 524 directs the current from the current source 530b through the desired RTD (e.g., 503c). As shown, the exemplary multiplexer 524 of FIG. 5B includes channels A and B in communication to RTDs 503c and 503d, respectively. Thus, when measuring the temperature of a particular one of RTDs 503c, 503d, the controller 512b can cause current to be supplied from the current source 530b and through the appropriate channel of the multiplexer 524 and through the desired RTD 503c, 503d to ground 540b in order to cause a voltage drop thereacross.

In the illustrated examples, to measure the voltage drop across a desired one of the plurality of RTDs 503c, 503d, the measurement circuit 510b includes a demultiplexer 526 having channels A and B corresponding to RTDs 503c and 503d, respectively. The controller 512b can direct the demultiplexer 526 to transmit a signal from either channel A or B depending on the desired RTD. The output of the demultiplexer 526 can be directed to the controller 512b for receiving the signal representing the voltage drop across one of RTDs 503c, 503d and indicative of the resistance, and therefore the temperature, of the RTD.

In some embodiments, the output of the demultiplexer 526 does not connect or otherwise has high impedance to ground. Accordingly, current flowing to an RTD (e.g., 503c) via a respective multiplexer 524 channel (e.g., channel A) will only flow through the RTD. The resulting voltage across the RTD (e.g., 503c) will similarly be present at the respective input channel (e.g., channel A) of the demultiplexer 526, and can be output therefrom for receiving by the controller 512b. In some examples, instead of being directly applied to controller 512b, the voltage across the RTD (e.g., 503c) at the output of the demultiplexer 526 can be applied to a first input of a differential amplifier 534b for measuring the voltage. The amplifier 534b can be used, for example, to compare the voltage at the output of the demultiplexer 526 to a reference voltage before outputting the resulting amplification to the controller 512b. Thus, as described herein, a signal output from the demultiplexer 526 for receiving by the controller 512b can, but need not be received directly by the controller 512b. Rather, in some embodiments, the controller 512b can receive a signal based on the signal at the output of the demultiplexer 526, such as an output signal from the amplifier 534b based on the output signal from the demultiplexer 526. Similar to the example described with respect to FIG. 5A, in some embodiments, the controller 512b can include a plurality of inputs and can receive signals representative of the voltage drop across and/or the resistance of each of a plurality of RTD's (e.g., 503c, 503d) simultaneously.

In some examples, the measurement circuit 510b can include a reference resistor 516 positioned between a second current source 532b and ground 540b. The current source 532b can provide a constant a known current through the reference resistor 516 of a known resistance to ground, causing a constant voltage drop across the reference resistor 516. The constant voltage can be calculated based on the known current from the current source 532b and the known resistance of the reference resistor 516. In some examples, the reference resistor 516 is located in a sensor head proximate RTDs 503c, 503d and is wired similarly to RTDs 503c, 503d. In some such embodiments, any unknown voltage drop due to unknown resistance of wires is for the reference resistor 516 and any RTD 503c, 503d is approximately equal. In the illustrated example, reference resistor 516 is coupled on one side to ground 540b and on the other side to a second input of the differential amplifier 534b. Thus, the current source 532b in combination with the reference resistor 516 can act to provide a known and constant voltage to the second input of the differential amplifier 534b (e.g., due to the reference resistor 516, plus the variable voltage due to the wiring). Thus, in some such examples, the output of differential amplifier 534b is unaffected by wiring resistance, and can be fed to the controller 512b.

As shown in the illustrated embodiment and described herein, the differential amplifier 534b can receive the voltage across the RTD (e.g., 503c) from the output of the demultiplexer 526 at one input and the reference voltage across the reference resistor 516 at its other input. Accordingly, the output of the differential amplifier 534b is indicative of the voltage difference between the voltage drop across the RTD and the known voltage drop across the reference resistor 516. The output of the differential amplifier 534b can be received by the controller 512b for ultimately determining the temperature of the RTD (e.g., 503c). It will be appreciated that, while an exemplary measurement circuit is shown in FIG. 5B, measuring the temperature of the RTD could be performed in any variety of ways without departing from the scope of this disclosure. For example, the voltage drop across the RTD could be received directly by the controller 512b as an analog input signal. Additionally or alternatively, a relaxation time of an RC circuit having a known capacitance, C, and a resistance, R, being the resistance of the RTD can be used to determine the resistance of the RTD. In some such examples, such a measurement can eliminate any resistance effect of any wires without using a reference (e.g., reference resistor 516).

In some embodiments, the controller 512b can operate the multiplexer 524 and the demultiplexer 526 in concert so that it is known which of the RTDs is being analyzed. For instance, with respect to the illustrative example of FIG. 5B, the controller 512b can operate the multiplexer 524 and the demultiplexer 526 on channel A so that the current from current source 530b flows through the same RTD 503c that is in communication with the differential amplifier 534b via the demultiplexer 526.

In an exemplary configuration such as shown in FIG. 5B, in which a plurality of RTDs 503c, 503d are in communication with different channels of the multiplexer 524 and the demultiplexer 526, the controller 512b can act to switch operating channels of the multiplexer 524 and demultiplexer 526 in order to perform temperature measurements of each of the RTDs 503c, 503d. For instance, in an exemplary embodiment, the controller can cycle through respective multiplexer 524 and demultiplexer 526 channels in order to perform temperature measurements of each of the respective RTDs 503c, 503d.

As described elsewhere herein, in some examples, the controller 512b can control temperature adjustment operation of one or more thermoelectric devices (e.g., 502c, 502d). In various embodiments, the controller 512b can continue or stop applying electrical power to a thermoelectric device prior to measuring the temperature of a corresponding RTD via the multiplexer 524 and demultiplexer 526. Similarly, applying electrical power to the thermoelectric device via the temperature control circuit 514b, the controller 512b can turn off the channel(s) associated with that thermoelectric device in the multiplexer 524 and demultiplexer 526. In some embodiments, for each individual thermoelectric device, the controller 512b can use the temperature control circuit 514b and the measurement circuit 510b (including the multiplexer 524 and demultiplexer 526) to switch between distinct temperature control and measurement modes of operation.

It will be appreciated that, while in the illustrative examples in FIGS. 5A and 5B include two thermoelectric devices (502c, 502d), in other embodiments, any number of thermoelectric devices can be used. In some examples, a demultiplexer 526 and/or a multiplexer 524 can include at least as many operating channels as there are thermoelectric devices (and in some examples, corresponding temperature sensing elements such as RTDs) operating in an array of thermoelectric devices. The controller 512b can be configured to apply electrical power to the thermoelectric devices to heat or cool each of the thermoelectric devices individually to a desired temperature. In some examples, the controller can interface with the thermoelectric devices or with corresponding RTDs to monitor the temperature of the thermoelectric devices.

Referring back to FIG. 1, a plurality of thermoelectric devices 102a-d can be disposed in the flow path of a process fluid in a fluid flow system. In some instances, the process fluid may include constituents that form deposits (e.g., scale, biofilm, asphaltenes, wax deposits, etc.) on various fluid flow system components, such as the walls of the flow path 106, sensors, process instruments (e.g., a use device 105 toward which the process fluid flows), and the like. In some examples, deposits that form on the thermoelectric devices 102a-d in the fluid flow path can act as an insulating layer between the thermoelectric device and the process fluid, which can affect the thermal behavior of the thermoelectric devices.

Accordingly, in some examples, observing the thermal behavior of one or more thermoelectric devices in the fluid flow path can provide information regarding the level of deposit present at the thermoelectric devices (e.g., 102a-d). FIGS. 6A-6E illustrate exemplary thermal behavior of a thermoelectric device that can be used to characterize the level of deposit at the thermoelectric device.

Figure 6A:
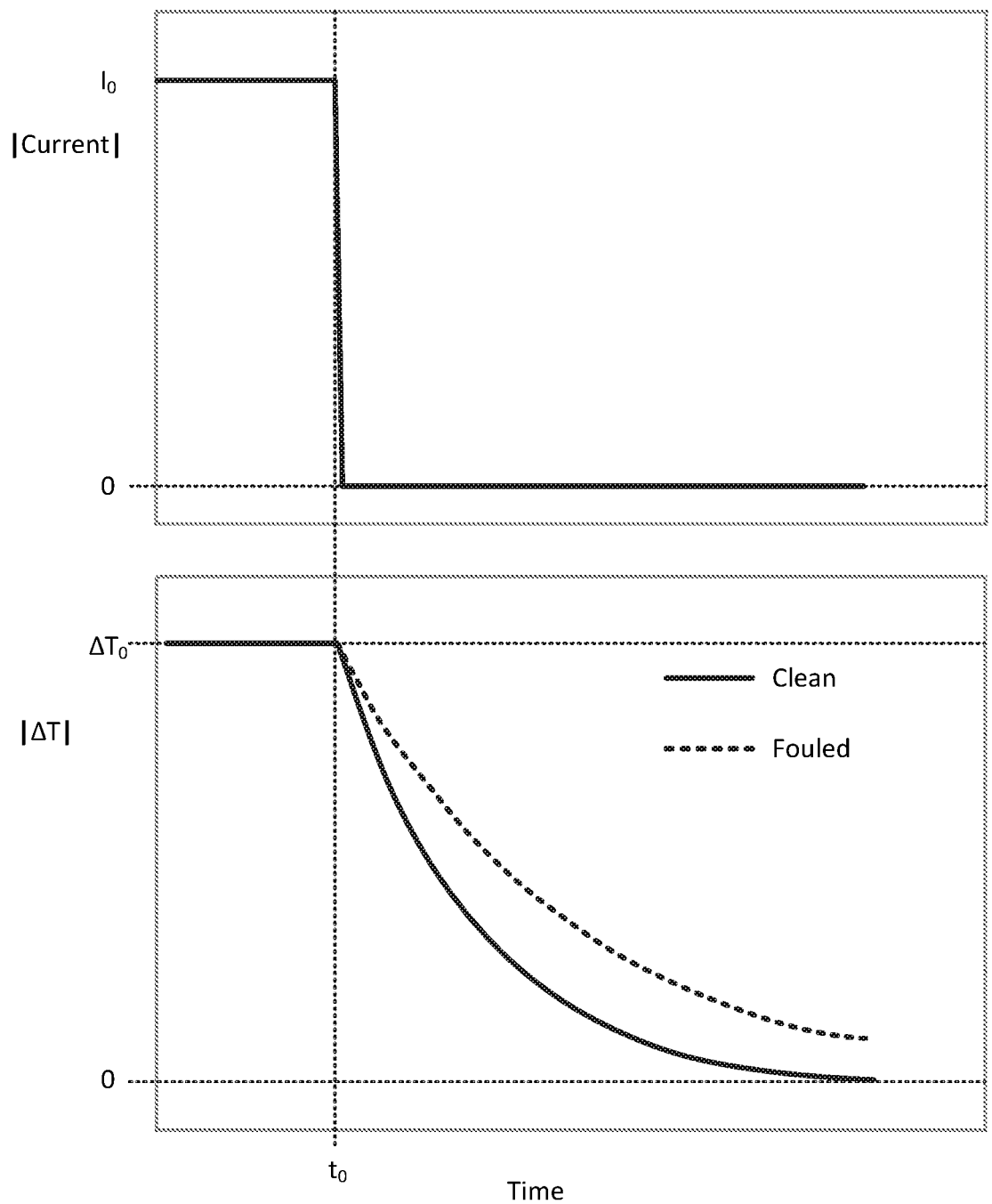
FIGS. 6A-6E illustrate exemplary thermal behavior of a thermoelectric device that can be used to characterize the level of deposit at the thermoelectric device.

FIG. 6A shows a plot of the magnitude of the temperature difference ($\Delta T$) between a thermoelectric device and the process fluid and the magnitude of a current applied to the thermoelectric device vs. time. In the illustrated example, a current is applied to a thermoelectric device (e.g., a smoothed DC current applied to thermoelectric device 502a via channel A of the temperature control circuit 514a of FIG. 5A). In various examples, the direction of the current can cause the temperature of the thermoelectric device to deviate from the temperature of the process fluid (increase the magnitude of $\Delta T$). For example, in some cases, a negative current can cause the thermoelectric device temperature to decrease relative to the temperature of the process fluid.

In the illustrated embodiment, a current having magnitude $I_0$ is applied to a thermoelectric device, resulting in a temperature difference of $\Delta T°$ from the process fluid temperature. At time $t_0$, the current is removed (or reduced in magnitude), and the temperature of the thermoelectric device begins to trend toward the bulk fluid temperature ($\Delta T=0$). That is, the temperature difference between the thermoelectric device and the process fluid decays toward zero. In the illustrated example, the temperature profiles of both the clean (solid line) and fouled (broken line) thermoelectric devices are shown. Though each thermoelectric device is brought to a temperature $\Delta T$ away from the temperature of the process fluid (not necessarily to the same temperature), the temperature of the clean thermoelectric device trends toward the temperature of the process fluid more quickly than the fouled (coated) thermoelectric device, since the deposit on the fouled thermoelectric device provides thermal insulation between the thermoelectric device and the process fluid. That is, the temperature difference $\Delta T$ of the clean thermoelectric device decays toward zero more quickly than the fouled thermoelectric device. In some embodiments, the decay profile of the temperature difference can be analyzed to determine the amount of deposit present on the thermoelectric device.

For example, with reference to FIG. 2, the controller 212 can adjust the temperature of the thermoelectric device 202 via the temperature control circuit 214. In some examples, the controller 212 can periodically switch to measurement mode to measure the temperature of the thermoelectric device 202 via the measurement circuit 210. At time $t_0$, the controller 212 ceases applying power to the thermoelectric device 202 via the temperature control circuit 214 and switches to measurement mode to monitor the temperature of the thermoelectric device 202 via the measurement circuit 210 as the temperature difference $\Delta T$ between the thermoelectric device and the process fluid decays toward zero due to the process fluid. The decay profile of the temperature difference $\Delta T$ between the thermoelectric device 202 and the process fluid can be monitored by the controller 212 via the measurement circuit 210. In some examples, the controller 212 is configured to analyze the temperature change profile (e.g., the decay of $\Delta T$ toward zero) to determine the level of deposit on the thermoelectric device 202. For instance, the controller 212 can fit the decay profile to a function such as an exponential function having a time constant. In some such examples, the fitting parameters can be used to determine the level of deposit.

In an exemplary embodiment, the temperature decay profile over time can be fit to a double exponential function. For example, in some instances, a first portion of the double exponential decay model can represent temperature change due to the process fluid flowing through the flow system. A second portion of the double exponential decay model can represent temperature conductivity from a heated thermoelectric device to other components, such as wires, a sample holder (e.g., 104 in FIG. 1) or other components. In some such embodiments, the double exponential fitting functions can independently represent both sources of temperature conduction in the same function, and can be weighted to reflect the relative amount and timing of such temperature changes. In some such examples, a fitting parameter in the first portion of the double exponential decay model is representative of the level of deposit on the surface of a thermoelectric device interfacing with the fluid. Thus, in some such embodiments, the second portion of the exponential does not contribute to the characterized level of deposit. It will be appreciated that other fitting functions can be used in addition or alternatively to such a double exponential function.

In some cases, using certain fitting functions in characterizing the deposit can be skewed if the thermoelectric device is allowed to reach equilibrium with the process fluid, after which it stops changing in temperature. Accordingly, in various embodiments, the controller 212 is configured to resume heating or cooling the thermoelectric device prior to the thermoelectric device reaching thermal equilibrium and/or to stop associating collected temperature data with the thermal profile of the thermoelectric device prior to the thermoelectric device reaching equilibrium with the process fluid. Doing so prevents steady-state data from undesirably altering the analysis of the thermal profile of the thermoelectric device. In other embodiments, the fitting function can account for equilibration of the thermoelectric device temperature and the process fluid temperature without skewing the fitting function. In some such embodiment, the type of fitting function and/or weighting factors in the fitting function can be used to account for such temperature equilibration.

In some embodiments, the difference in $\Delta T$ decay profiles of between clean and fouled thermoelectric devices can be used to determine the level of deposit on the fouled thermoelectric device. The $\Delta T$ decay profile of the clean thermoelectric device can be recalled from memory or determined from a thermoelectric device known to be free from deposit. In some instances, a fitting parameter such as a time constant can be temperature-independent. Thus, in some such embodiments, it is not necessary that the clean and fouled thermoelectric devices are brought to the same temperature relative to the process fluid for comparing aspects of their $\Delta T$ decay profiles.

Figure 6B:
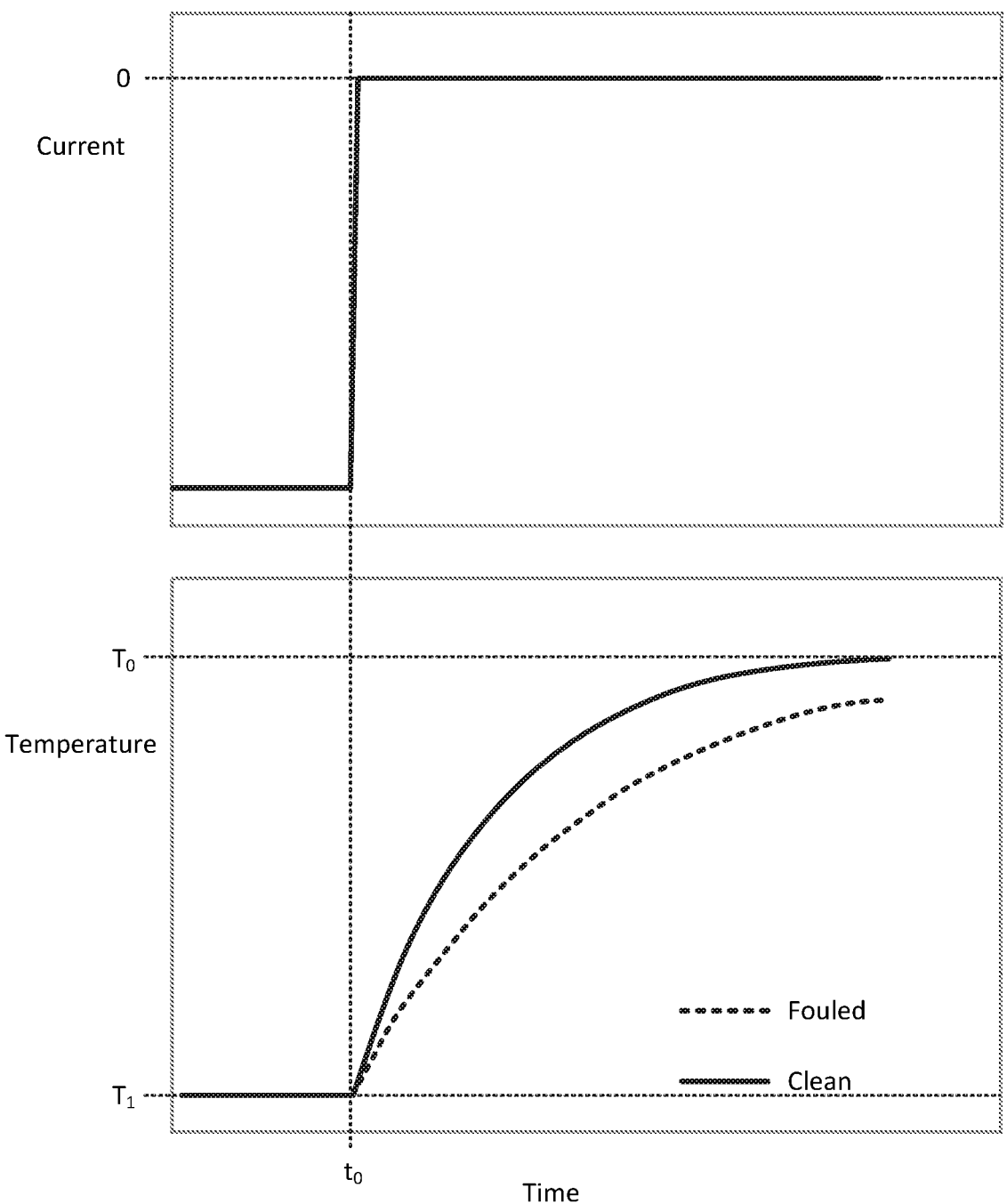

FIG. 6B shows a plot of the temperature of a thermoelectric device and the current applied to the thermoelectric device vs. time. In the illustrated example, a negative current is applied to a thermoelectric device (e.g., a smoothed DC current applied to thermoelectric device 502a via channel A of the temperature control circuit 514a of FIG. 5A), which causes the thermoelectric device to operate at a temperature $T_1$, which is lower than the temperature of the process fluid, $T_0$.

At time $t_0$, the current is removed (or reduced in magnitude), and the temperature of the thermoelectric device begins to rise toward the bulk fluid temperature $T_0$. In the illustrated example, the temperature profiles of both the clean (solid line) and fouled (broken line) thermoelectric devices are shown. Though the clean and fouled thermoelectric devices are each cooled to a temperature below $T_0$, the clean thermoelectric device warms to $T_0$ more quickly than the fouled (coated) thermoelectric device, since the deposit on the fouled thermoelectric device provides thermal insulation between the thermoelectric device and the process fluid. As noted elsewhere herein, in some embodiments, the temperature profile (e.g., the temperature increase profile) can be analyzed to determine the amount of deposit present on the thermoelectric device. It will be appreciated that, while the illustrated examples show the clean and fouled thermoelectric devices being cooled to the same temperature $T_1$, thermoelectric devices do not need to generally be cooled to the same temperature (e.g., $T_1$) each time for the temperature profile to be analyzed or the amount of deposit to be determined.

Figure 6C:
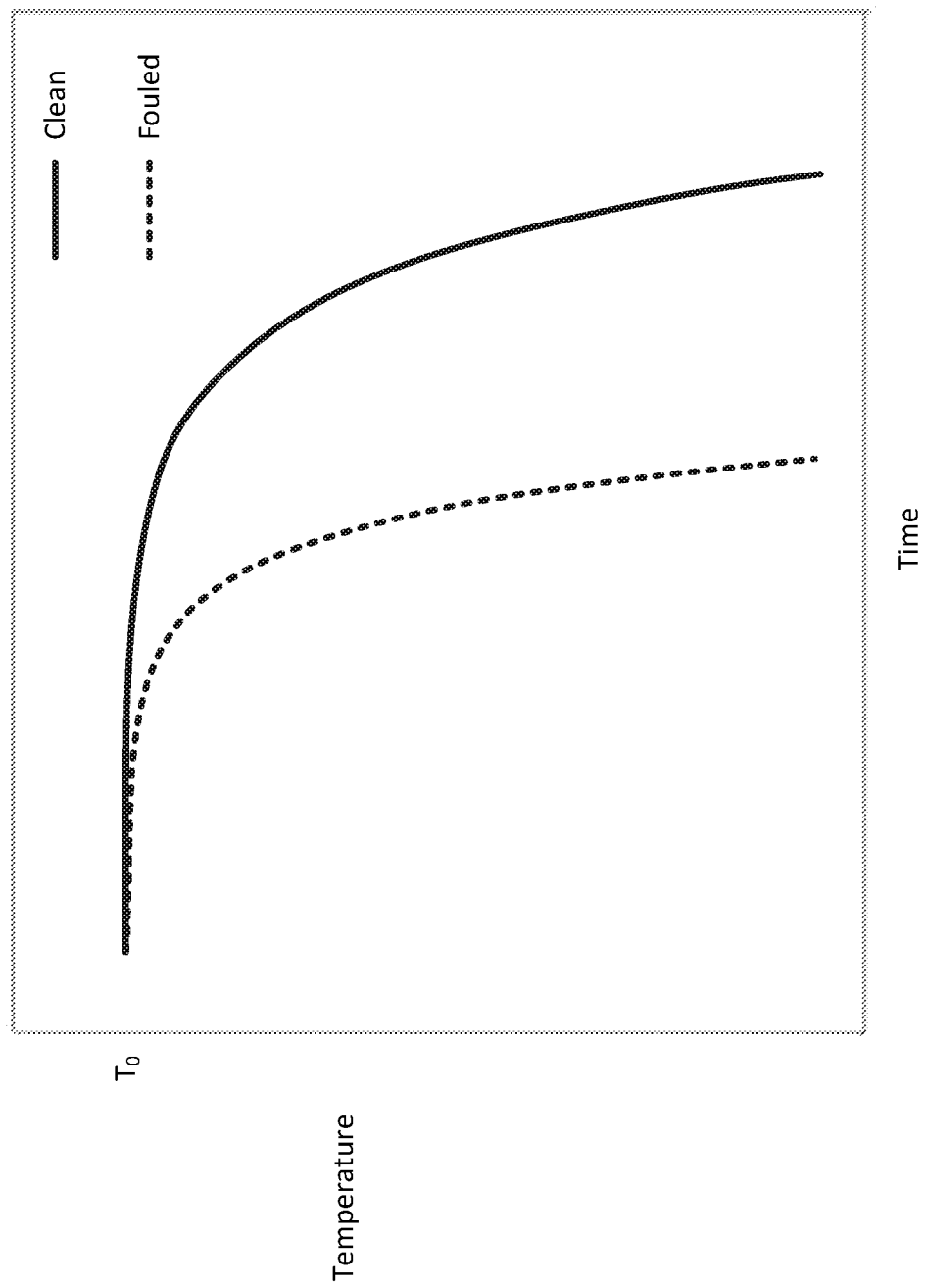

FIG. 6C shows a plot of the temperature T of a thermoelectric device vs. time. In the illustrated example, a thermoelectric device is cooled from a steady state condition (e.g., thermal equilibrium with the process fluid) while the temperature is monitored. As opposed to the temperature monitoring of FIGS. 6A and 6B, in which the temperature is returning to an equilibrium temperature from a heated or cooled state, the temperature of the thermoelectric device is monitored during a cooling process. That is, monitoring the temperature of the thermoelectric device is performed substantially simultaneously as decreasing the temperature of the thermoelectric device. Accordingly, in some embodiments, in order to achieve a plot such as that shown in FIG. 6C, the thermoelectric device can be rapidly switched from the temperature control mode to the measurement mode and back to the temperature control mode in order to achieve a nearly instantaneous temperature measurement while the temperature of the thermoelectric device does not significantly change during the measurement due to the process fluid. In such a procedure, the temperature of the thermoelectric device can be decreased via the temperature control circuit and periodically sampled via the measurement circuit in order to determine a cooling profile of the thermoelectric device over time. In other examples, a configuration such as that shown in FIG. 5B can be used, wherein, for example, a thermoelectric device (e.g., 502c) can be cooled while the temperature of the thermoelectric device (e.g., 502c) can be simultaneously monitored by a separate component (e.g., RTD 503c).

While shown as being a temperature vs. time plot, it will be appreciated that FIG. 6C could similarly be represented as a plot of the temperature difference between the temperature of the thermoelectric device and the process fluid (or the absolute value thereof) vs. time. For example, a plot of the absolute value of the temperature difference between the thermoelectric device and the process fluid (|ΔT|) vs. time would be shaped similar to the plot in FIG. 6C, except for the data would start at 0 (i.e., the thermoelectric device is in thermal equilibrium with the process fluid), and climb as the temperature deviates from the temperature of the process fluid. This plot (|ΔT| vs. time) would then have a similar shape whether or not the thermoelectric device is heated or cooled relative to the process fluid.

Similar to FIGS. 6A and 6B discussed above, the plot of FIG. 6C includes two curves—one representative of a clean thermoelectric device (solid line) and one representative of a fouled thermoelectric device (broken line). As shown, the fouled thermoelectric device change temperature much more quickly than the clean thermoelectric device, since the deposit on the fouled thermoelectric device insulates the thermoelectric device from the equilibrating effects of the process fluid. Thus, in some examples, the temperature change profile of the thermoelectric device can be used to determine a level of deposit on the thermoelectric device, for example, by fitting the temperature profile to a function.

Figure 6D:
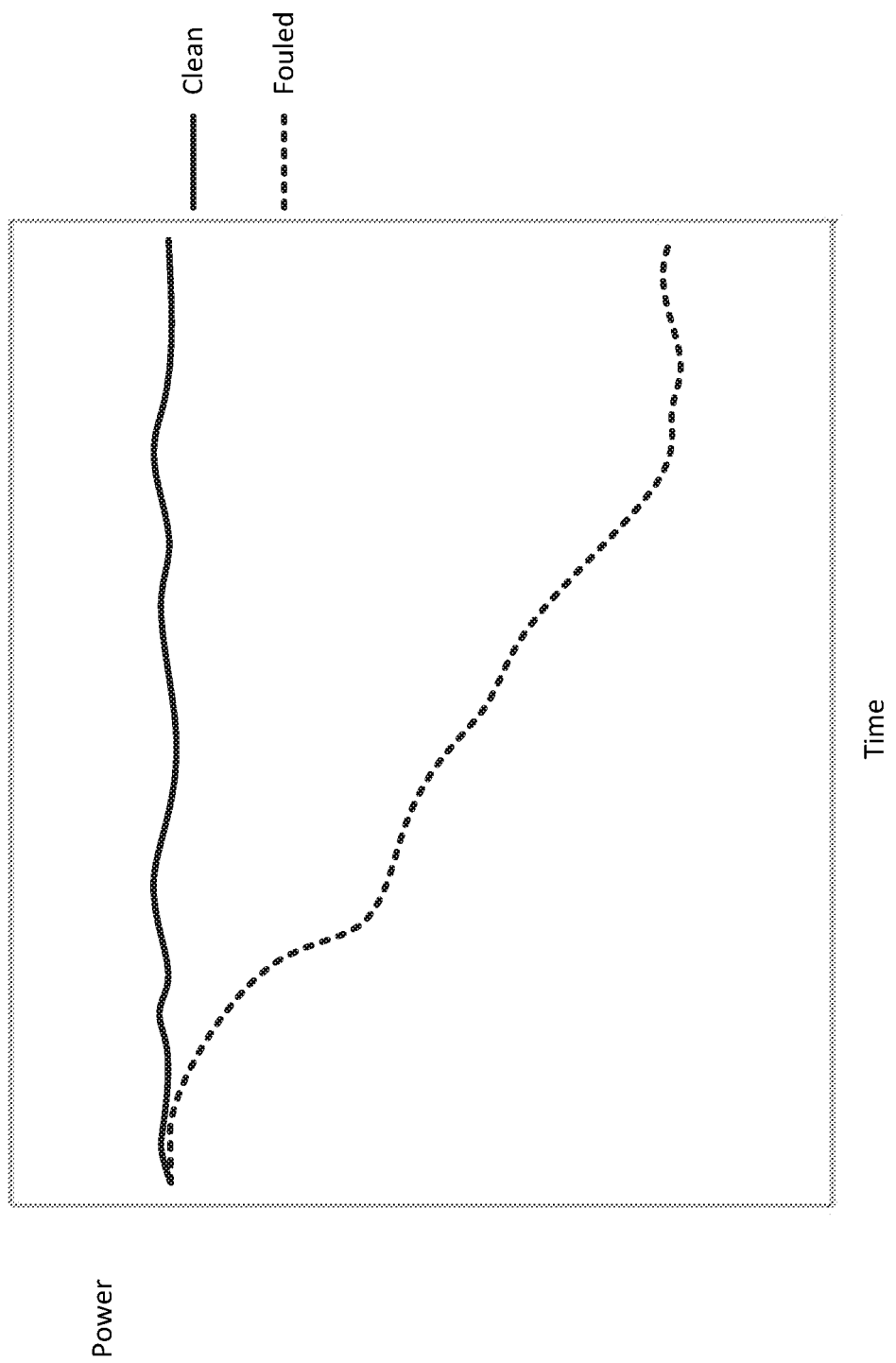

In some embodiments, rather than observing properties regarding thermoelectric device temperature change, a thermoelectric device can be raised to a fixed operating temperature by applying the necessary amount of electrical power to the thermoelectric device. FIG. 6D shows a plot of the power required to maintain a thermoelectric device at a constant temperature over time. As shown, the power required to maintain a clean thermoelectric device (solid line) at a constant temperature remains relatively constant over time, as the thermoelectric device and process fluid reach an equilibrium condition. However, if deposits form on the thermoelectric device over time (as shown in the broken line representing a fouled thermoelectric device), the insulating properties of the deposit shield the thermoelectric device from the equilibrating effects of the process fluid. Thus, as the deposit forms over time, less power is required to be applied to the thermoelectric device in order to maintain a constant temperature that is different from the process fluid temperature.

With reference to FIG. 5A, in some embodiments, the controller 512a is configured to adjust the temperature of a thermoelectric device (e.g., 502a) via the temperature control circuit 514a. The controller 512a can periodically measure the temperature of the thermoelectric device (e.g., 502a) via the measurement circuit 510a as a way of providing feedback for the temperature control circuit operation 514a. That is, the controller 512a can determine the temperature of the thermoelectric device (e.g., 502a) via the measurement circuit and adjust the power applied to the thermoelectric device (e.g., 502a) via the temperature control circuit 514a accordingly to achieve and maintain a desired temperature at the thermoelectric device. In some such embodiments, the controller switches back and forth between the temperature control mode and the measurement mode rapidly so that the temperature of the thermoelectric device does not significantly change while measuring the temperature. In various examples, the controller 512a can determine how much power is being applied to the thermoelectric device (e.g., 502a), for example, via a magnitude, duty cycle, or other parameter applied from one or more components of the temperature control circuit 514a controlled by the controller 512a.

In other examples, with reference to FIG. 5B, power can be constantly applied to a thermoelectric device (e.g., 502c) via the temperature control circuit 514b while the temperature of the thermoelectric device is measured via a separate component (e.g., RTD 503c and measurement circuit 510b). Controller 512b can use data received from the measurement circuit 510b as a feedback signal for adjusting the power necessary to maintain the temperature of the thermoelectric device 502c.

In some examples, the amount of power required to maintain the thermoelectric device at a fixed temperature is compared to the power required to maintain a clean thermoelectric device at the fixed temperature. The comparison can be used to determine the level of deposit on the thermoelectric device. Additionally or alternatively, the profile of the required power to maintain the thermoelectric device at the fixed temperature over time can be used to determine the level of deposit on the thermoelectric device. For instance, the rate of change in the power required to maintain the thermoelectric device at the fixed temperature can be indicative of the rate of deposition of the deposit, which can be used to determine the level of a deposit after a certain amount of time.

In another embodiment, a thermoelectric device can be operated in the temperature control mode by applying a constant amount of power to the thermoelectric device via the temperature control circuit and observing the resulting temperature of the thermoelectric device. For instance, during exemplary operation, the controller can provide a constant power to a thermoelectric device via the temperature control circuit and periodically measure the temperature of the thermoelectric device via the measurement circuit. The switching from the temperature control mode (applying constant power) to the measurement mode (to measure the temperature) and back to the temperature control mode (applying constant power) can be performed rapidly so that the temperature of the thermoelectric device does not significantly change during the temperature measurement. Alternatively, similar to the operating arrangement described above with respect to FIG. 5B, the constant power can be applied to the thermoelectric device while the temperature of the thermoelectric device can be continuously monitored, for example, via an RTD.

Figure 6E:
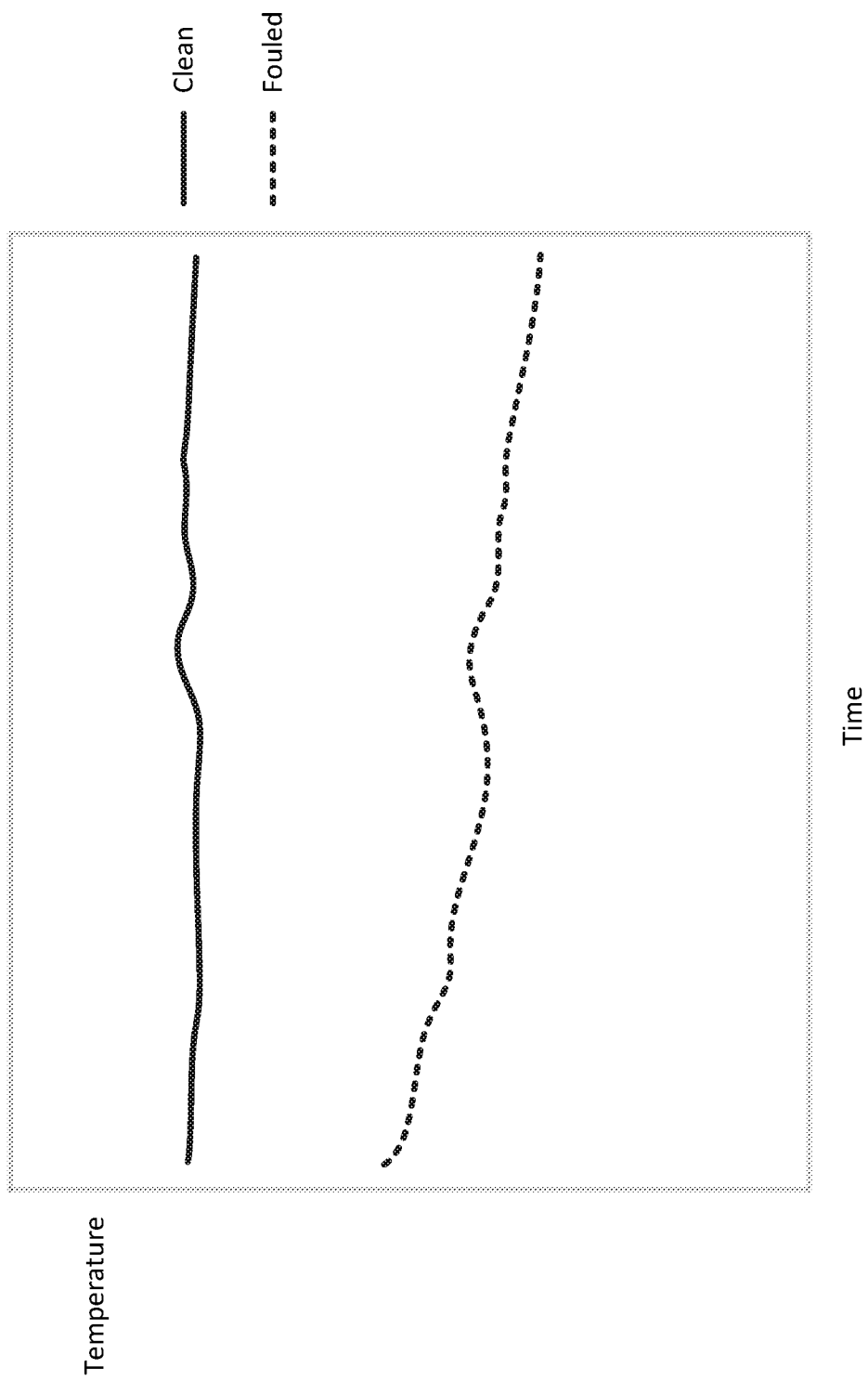

FIG. 6E is a plot of temperature vs time of a thermoelectric device to which a constant power is applied via a temperature control circuit. In the event of a clean thermoelectric device (solid line), the resulting temperature from the applied constant power is approximately constant over time. However, the temperature of a fouled thermoelectric device (broken line) changes over time. The direction of temperature change in some thermoelectric devices depends on the polarity of electrical power applied to the device. In the illustrated example, the temperature of the fouled thermoelectric device decreases over time, for example, due to application of electrical power to the thermoelectric device in a direction that causes the temperature of the thermoelectric device to decrease. As described elsewhere herein, as deposits form on the thermoelectric device, the deposits insulate the thermoelectric device from the cooling effects of the process fluid. In general, a thicker deposit will result in greater insulating properties, and thus a greater temperature deviation from the process fluid temperature is achieved by applying the same power to the thermoelectric device. Similar to examples described elsewhere herein, it will be appreciated that a similar analysis of the temperature difference from the bulk process fluid temperature ($\Delta T$) or the absolute value thereof ($|\Delta T|$) can be similarly analyzed over time.

In some embodiments, the difference in temperature between a clean thermoelectric device and a thermoelectric device under test when a constant power is applied to each can be used to determine the level of deposit on the thermoelectric device under test. Additionally or alternatively, the rate of temperature increase based on a constant applied power can provide information regarding the rate of deposition of a deposit on a thermoelectric device, which can be used to determine a level of deposit on the thermoelectric device.

With reference to FIGS. 6A-6E, various processes have been described for characterizing a deposit on a thermoelectric device. Such processes generally involve changing the temperature of the thermoelectric device via a temperature control circuit and measuring a temperature of the thermoelectric device via a measurement circuit. As discussed elsewhere herein, the temperature of the thermoelectric device can be measured directly, or in some embodiments, can be measured via another device such as an RTD. Changes in the thermal behavior of the thermoelectric device (e.g., temperature increase or decay profile, the applied power required to reach a predetermined temperature, the temperature achieved at a predetermined applied power) provide evidence of a deposit forming on the thermoelectric device. In some examples, such changes can be used to determine a level of deposit on the thermoelectric device.

In various embodiments, a controller can be configured to interface with a temperature control circuit and a measurement circuit in order to perform one or more of such processes to observe or detect any deposition from a process fluid onto a thermoelectric device.

In an exemplary implementation with reference to FIGS. 1 and 2, a thermoelectric device (e.g., 102a) can be adjusted to match or approximately match the operating temperature of a use device 105 via a temperature control circuit (e.g., 214). Since the deposition of constituents of a process fluid is often temperature dependent, elevating the temperature of the thermoelectric device to the operating temperature of the use device can simulate the surface of the use device at the thermoelectric device. Accordingly, deposits detected at the thermoelectric device can be used to estimate deposits at the use device.

In some examples, the use device becomes less functional when deposits are present. For instance, in a heat exchanger system wherein the use device comprises a heat exchange surface, deposits formed on the heat exchange surface can negatively impact the ability for the heat exchange surface to transfer heat. Accordingly, sufficient depots detected at the thermoelectric device can alert a system operator of likely deposits at the heat exchange surface, and corrective action can be taken (e.g., cleaning the heat exchange surface). However, even if the thermoelectric device simulating the use device allows a system operator to detect the presence of a deposit at the use device, addressing the detected deposit (e.g., cleaning, etc.) can require costly system downtime and maintenance since the deposition has already occurred.

Additionally or alternatively, in some instances, various deposits may not clean well even if removed for a cleaning process, possibly rendering the use device less effective.

Accordingly, in some embodiments, a plurality of thermoelectric devices (e.g., 102a-d) can be disposed in a single fluid flow path (e.g., 106) and used to characterize the status of the process fluid and/or the fluid flow system (e.g., 100). With reference to FIG. 1, in an exemplary implementation, use device 105 of the fluid flow system 100 typically operates at operating temperature $T_O$. Thermoelectric devices 102a-d can be adjusted to match or approximately match temperatures more likely to drive deposition of a deposit from the process fluid than $T_O$. Various process fluids can include constituents that can be deposited from the process fluid. For instance, in some cases, process fluids can include calcium and/or magnesium sulfates, carbonates, and/or silicates that can be more likely to form deposits on surfaces at elevated temperatures. In other examples, process fluids including, for instance, asphaltenes, waxes or organic material that is soluble at elevated temperature but precipitates at low temperatures can be more likely to form deposits on cooler temperature surfaces.

Some such process fluids are more prone to produce deposits on higher or lower temperature surfaces depending on the deposit. In some such examples, one or more of the plurality of thermoelectric devices 102a-d are adjusted to a temperature that is higher or lower than the typical operating temperature of the use device 105 in order to induce deposits onto the thermoelectric devices and to characterize the deposits forming on the thermoelectric devices. This also can represent a "worst case" for use device 105 operation when deposit formation is more likely than usual, such as at a lower-than-usual temperature that can lead to asphaltene and/or wax deposits forming on the one or more thermoelectric devices.

For example, with reference to FIG. 5A, in an exemplary embodiment, each of thermoelectric devices 502a, 502b is cooled to a different characterization temperature via channels A and B, respectively, of the temperature control circuit 514. In the exemplary embodiment, the characterization temperature of each of the thermoelectric devices 502a, 502b is at or below a typical operating temperature of a use device of the fluid flow system. In some such examples, the controller 512a controls the temperature control circuit 514a to maintain the thermoelectric devices 502a, 502b at their respective characterization temperatures. The controller 512a can periodically switch to operate thermoelectric devices 502a, 502b in a measurement mode via the measurement circuit 510a (e.g., using switch 522 in FIG. 5A).

In other examples, for example, with respect to FIG. 5B, the controller 512a can be configured to simultaneously cool the thermoelectric devices 502c and 502d via the temperature control circuit 514b while monitoring the temperatures of the thermoelectric devices 502c and 502d (e.g., via RTDs 503c and 503d, multiplexer 524 and demultiplexer 526 and current sources 530b, 532b) to ensure the thermoelectric devices 502c, 502d are operating at the desired characterization temperature.

During operation, after maintaining the thermoelectric devices at their respective characterization temperatures, the controller can be configured to perform a deposit characterization process such as those described above with respect to any of FIGS. 6A-E. For example, the controller can, be configured to simultaneously and/or alternatingly control the temperature of a thermoelectric device in the temperature control mode and monitor the temperature of the thermoelectric device in the measurement mode. For instance, in some examples, the controller is configured to periodically observe the temperature of a thermoelectric device to observe the thermal behavior of the thermoelectric device. In some examples, periodically observing the temperature of the thermoelectric device comprises periodically switching between the temperature control mode and measurement mode and observing changes in the thermal behavior of the thermoelectric device. In other examples, periodically observing the temperature can include simultaneously controlling and measuring the temperature of a thermoelectric device. As described with respect to FIGS. 6A-E, periodically observing the temperature of a thermoelectric device (e.g., switching between the temperature control mode and the measurement mode or simultaneously adjusting and measuring the temperature of a thermoelectric device) can be performed in a variety of ways.

For example, periodically observing the temperature of a thermoelectric device can include, after bringing a thermoelectric device to a non-equilibrium temperature in the temperature control mode before switching to a measurement mode for a period of time to observe the temperature change profile of the thermoelectric device (e.g., as in FIG. 6A) before controlling the temperature again. Similarly, the temperature of the thermoelectric device can be brought to a non-equilibrium temperature (e.g., a cooled temperature relative to the process fluid) by applying electrical power to the thermoelectric device. During this time, the temperature of the thermoelectric device can be measured via a proximate device, such as a corresponding RTD. Electrical power can stop being applied to the thermoelectric device and the temperature change profile of the thermoelectric device can be observed by continuing to monitor the temperature measured by the proximate device (e.g., an RTD). Changes observed in the thermal behavior of the thermoelectric device can include a change in time constant demonstrated by the temperature profile over time (e.g., in a decay of $|\Delta T|$ as shown in FIG. 6A).

In other examples, periodically observing the temperature of a thermoelectric device can include periodically switching between the temperature control mode and the measurement mode can include adjusting the temperature of the thermoelectric device while rapidly switching to the measurement mode to sample the temperature of the thermoelectric device and back to the temperature control mode to continue adjusting the temperature (e.g., as in FIG. 6C). In other examples, periodically observing the temperature of the thermoelectric device can include, while adjusting the temperature of the thermoelectric device in the temperature control mode, simultaneously observing the temperature of the thermoelectric device via a proximate device, such as an RTD, in a measurement mode. Similarly, changes in the thermal behavior of the thermoelectric device can include changes in a time constant demonstrated in the temperature profile.

In still another example, periodically observing the temperature of the thermoelectric device can include periodically switching between the temperature control mode and the measurement mode can include applying electrical power to the thermoelectric device to maintain the thermoelectric device at a constant temperature while periodically switching to the measurement mode to confirm the constant temperature is maintained (e.g., as illustrated in FIG. 6C). In other examples, periodically observing the temperature of the thermoelectric device includes, while applying the electrical power to the thermoelectric device, simultaneously observing the temperature of the thermoelectric device via a proximate device (e.g., an RTD). In such embodiments, changes in thermal behavior of the thermoelectric device can include changes in the amount of power applied by the temperature control circuit to maintain the temperature of the thermoelectric device at the constant temperature.

Alternatively, periodically observing the temperature of the thermoelectric device can include periodically switching between the temperature control mode and the measurement mode can include applying a constant applied electrical power to the thermoelectric device while periodically sampling the temperature of the thermoelectric device in the measurement mode (e.g., as illustrated in FIG. 6D). In other examples, periodically observing the temperature of the thermoelectric device can include observing the temperature of the thermoelectric device via a proximate device, such as an RTD, while applying the constant electrical power to the thermoelectric device. In such embodiments, changes in the thermal behavior of the thermoelectric device can include changes in the temperature achieved by the thermoelectric device due to the constant applied amount of power.

As discussed elsewhere herein, observing such changes in the thermal behavior of a thermoelectric device can be indicative of and/or used to determine a level of deposit on the thermoelectric device. Thus, in some examples, the controller can perform any of such processes on the plurality of thermoelectric devices that have been brought to different temperatures (e.g., cooled to temperature to induce deposits of asphaltenes, waxes or other process fluid constituents) to characterize the level of deposit on each of the thermoelectric devices. In some such examples, the controller characterizes the deposit level at each of the thermoelectric devices individually via corresponding channels (e.g., channels A and B in the multiplexer 524 and demultiplexer 526 in FIG. 5B).

The controller can be configured to associate the level of deposit of each thermoelectric device with its corresponding characterization temperature. That is, the controller can determine a level of deposit at each of the thermoelectric devices and associate the level of deposit with the initial characterization temperature of each of the respective thermoelectric devices. The associated deposit levels and operating temperatures can be used to characterize a temperature dependence of deposition on surfaces in the fluid flow system. For example, in an exemplary embodiment, if the typical operating temperature of the use device (e.g., a heat exchanger surface, a chiller, or a produced water cooler) is higher than the characterization temperatures of the thermoelectric device, and deposits are driven by decreased temperature, the use device will tend to have less deposit than the thermoelectric devices. Moreover, the temperature dependence of deposition characterized by the thermoelectric device operation can be used to infer the likelihood of deposits forming on the use device or other portions of the fluid flow system.

Additionally or alternatively, periodically observing the depositions on the various thermoelectric devices operating at different characterization temperatures can provide information regarding general increases or decreases in the occurrence of depositions. Such changes in deposition characteristics of the process fluid can be due to a variety of factors affecting the fluid flow system, such as a change in the temperature or concentration of constituents in the process fluid.

In an exemplary operation, an increase in deposition and/or deposition rate detected from the characterization thermoelectric devices can be indicative of a deposit condition for the use device, in which deposits forming on the use device during normal operation become more likely. The detection of a deposit condition can initiate subsequent analysis to determine the cause of increased deposition, such as measuring one or more parameters of the process fluid. In some instances, this can be performed automatically, for example, by the controller.

Additionally or alternatively, one or more parameters of the process fluid can be adjusted to reduce the deposits deposited from the process fluid into the fluid flow system and/or to eliminate the deposits that have already accumulated. For instance, a detected increase in deposition can cause an acid or other cleaning chemical to be released to attempt to remove the deposit. Similarly, in some examples, a chemical such as an acid, a scale inhibitor chemical, a scale dispersant, a biocide (e.g., bleach), or the like can be added to the process fluid to reduce the likelihood of further deposition. In some examples, a cold deposit (e.g., wax deposits) can be addressed by increasing process temperatures (e.g., via steam or heaters) and/or introducing chemicals such as deposit inhibitors such as dispersants and/or surfactants. Some examples of deposit inhibitors for asphaltenes and waxes include, but are not limited to: nonylphenol resins, DDBSA (Dodecylbenzenesulfonic acid), cardanol, ethylene vinyl acetate, poly ethylene-butene and poly (ethylene-propylene).

In some examples, an increase in deposition (e.g., wax buildup) over time can be due to the absence of or reduction in one or more typical process fluid constituents (e.g., solvents) that inhibit such deposition. The absence or reduction in such constitutes can be due, for example, due to equipment malfunction or depletion of a chemical from a reservoir or chemical source. Reintroducing the constituent into the process fluid can act to reduce the amount of deposition from the process fluid into the fluid flow system. Additionally or alternatively, various fluid properties that can impact the likelihood of deposit formation can be measured via one or more sensors (e.g., 111) in the fluid flow system, such as fluid operating temperature, pH, alkalinity, and the like. Adjusting such factors can help to reduce the amount and/or likelihood of deposition.

In various embodiments, any number of steps can be taken in response to address an increase in detected deposition or other observed deposition trends. In some embodiments, the controller is configured to alert a user of changes or trends in deposits. For example, in various embodiments, the controller can alert a user if deposit rates, levels, and/or changes therein meet a certain criteria. In some such examples, criteria can be temperature dependent (e.g., a deposit level or rate occurring at a thermoelectric device with a certain characterization temperature) or temperature independent. Additionally or alternatively, the controller can alert a user if determined properties of the process fluid satisfy certain criteria, such as too low or too high of a concentration of a fluid constituent (e.g., that increase or decrease likelihood of deposits) and/or various fluid properties that may impact the amount and/or likelihood of deposition.

In some such examples, alerting the user is performed when the system is potentially trending toward an environment in which deposits may being to form on the use device so that corrective and/or preventative action can be taken before significant deposits form on the use device. In some examples, an alert to a user can include additional information, such as information regarding properties of the process fluid flowing through the system, to better help the user take appropriate action. Additionally or alternatively, in some embodiments, the controller can be configured to interface with other equipment (e.g., pumps, valves, etc.) in order to perform such action automatically.

In some systems, certain deposits become more likely as the deposit surface temperature increases. Thus, in some embodiments, thermoelectric devices (e.g., 502a, 502b) can be cooled to temperatures below the typical operating temperatures of a use device in order to intentionally induce and monitor deposits from the process fluid can help to determine situations in which the use device is at risk for undesired deposits. In some such embodiments, observing deposition characteristics on one or more thermoelectric devices that are operating at a temperature lower than a typical temperature of the use device can be used to determine deposition trends or events at certain surface temperature while minimizing the risk of actual deposition on the use device. In some instances, lowering different thermoelectric devices to different temperature provides the controller with information regarding the temperature dependence of deposit formation in the fluid flow system, and can be further used to characterize deposit formation in the fluid flow system.

After repeated or prolonged characterization in which the thermoelectric devices are cooled to induce deposits, the thermoelectric devices may eventually become too coated for effective characterization. In some such embodiments, the plurality of thermoelectric devices (e.g., 102a-d) can be removed from the system and cleaned or replaced without disrupting operation of the system or use device. For example, with reference to FIG. 1, the thermoelectric devices 102a-d can be mounted to a sample holder 104 that is easily removable from the system 100 for servicing the thermoelectric devices 102a-d. Thus, in some embodiments, cleaning or replacing the characterization thermoelectric devices can be performed with much lower cost and less downtime than having to service the use device itself.

In other examples, some deposits, such as waxes, can be removed by heating the thermoelectric devices. Thus, in some embodiments, electrical power can be applied to one or more thermoelectric devices (e.g., via temperature control circuit 514) in a polarity such that the temperature of the thermoelectric device(s) increase enough to drive off any deposits that have formed. Thus, in an exemplary process, electrical power can be applied to a thermoelectric device in a first polarity in order to decrease the temperature of the thermoelectric device and induce deposits thereon. Thermal behavior of the thermoelectric device can be analyzed as described elsewhere herein in order to characterize deposits (e.g., wax deposits) in the system. If cleaning of the thermoelectric device is desired, electrical power can be applied to the thermoelectric device in a second polarity, opposite the first, to increase the temperature of the thermoelectric device and drive off such deposits.

In some examples, the likelihood of deposits forming within a fluid flow system can be considered a deposition potential of the system. In various embodiments, the deposition potential can be a function of surface temperature of an object within the fluid flow system. In other examples, the deposition potential may be associated with a particular use device within the system. In some systems, the deposition potential can be used as a metric for observing the absolute likelihood of deposits forming within the system. Additionally or alternatively, the deposition potential can be used as a metric for observing change in the deposit conditions within the fluid flow system. In some such examples, the absolute deposition potential need not necessarily correspond to a deposit condition, but changes in the deposition potential may be indicative of increased likelihood of a deposit condition, for example.

Figure 7:
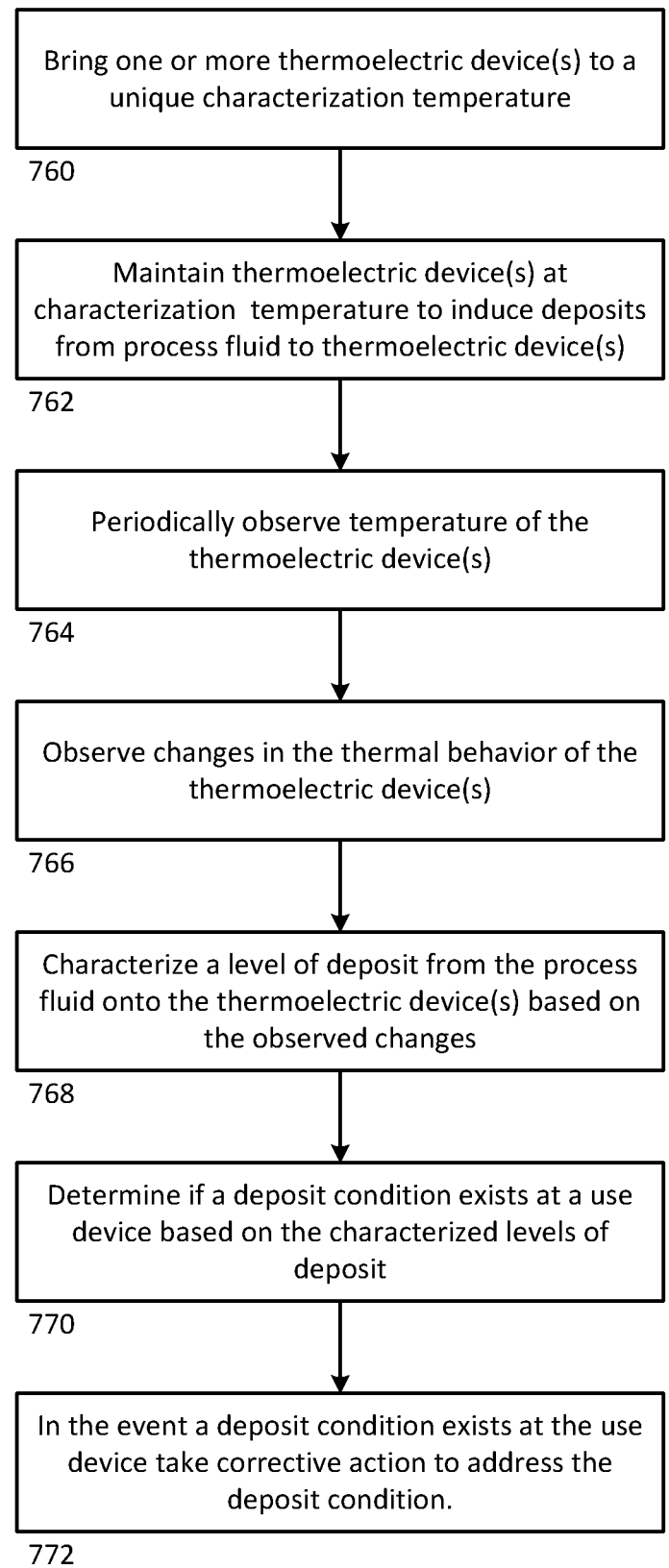
FIG. 7 is a process-flow diagram illustrating an exemplary process for mitigating deposits from a process fluid onto a use device in a fluid flow system.

FIG. 7 is a process-flow diagram illustrating an exemplary process for assessing the deposition potential of a process fluid onto a use device in a fluid flow system. The method includes bringing one or more thermoelectric device(s) to a unique characterization temperature (760) and maintaining the thermoelectric device(s) at the characterization temperatures to drive deposits from the process fluid onto the thermoelectric device(s) (762). This can be performed, for example, by operating the thermoelectric device(s) in a temperature control mode using a temperature control circuit as described elsewhere herein. In some examples, at least one of the characterization temperatures is lower than an operating temperature of the use device. It will be appreciated that, bringing one or more thermoelectric device(s) to a characterization temperature can include operating one or more thermoelectric device(s) in thermal equilibrium with the process fluid flowing through the fluid flow system. That is, the characterization temperature for one or more thermoelectric devices can be approximately the same temperature as the process fluid flowing through the fluid flow system.

The method further includes periodically observing the temperature of the thermoelectric device(s) (764). As described elsewhere herein, periodically observing the temperature of the thermoelectric device(s) can include periodically switching the thermoelectric device(s) from the temperature control mode to a measurement mode to measure the temperature of the thermoelectric device(s). Additionally or alternatively, periodically observing the temperature of the thermoelectric device(s) can include operating the thermoelectric device in the temperature control mode and periodically observing the temperature of the thermoelectric device via a proximate component such as an RTD.

The method includes the step of observing changes in the thermal behavior of the thermoelectric device(s) (766). This can include, for example, processes as described with respect to FIGS. 6A-E. The observed changes can be used to characterize a level of deposit from the process fluid onto each of the one or more thermoelectric device(s) (768). This can include, for example, determining a time constant for a fitting function of measured temperature profiles and observing changes to the time constant at different measurement times. Changes in the time constant can be representative of deposits forming on the thermoelectric device and altering the thermal behavior of the thermoelectric device. In some examples, characterizing the level of deposit can include comparing temperature change profiles for thermoelectric devices operating at difference characterization temperatures (e.g., a cooled thermoelectric device and an uncooled thermoelectric device).

In addition to a deposit thickness, additional characterization of the levels of deposit can include determining a likely deposited material in the system. Comparing the thermal decay profiles for cooled and uncooled or only slightly cooled thermoelectric devices, the nature of the deposit can be determined. For example, in some cases, sedimentation deposits are generally unaffected by the surface temperature, while wax deposit effects will be enhanced at lower temperatures. Thus, the characterization temperature dependence of the thermal profiles can be used to characterize the type of deposits present at the thermoelectric devices and within the fluid flow system.

The method can further include determining if a deposit condition exists at the use device (770). This can include, for example, monitoring the deposition levels and/or rates at the plurality of thermoelectric device(s) over time to observe deposition trends. In some examples, certain rates of deposition or increases in rates of deposition can indicate a deposit condition in which deposits forming on the use device become more likely. In some such examples, levels of deposit, rates of deposit, and/or changes therein at a thermoelectric device can be analyzed in combination with its associated characterization temperature to determine if a deposit condition exists. Additionally or alternatively, analyzing the relationship of such data (e.g., levels of deposit, rates of deposit, and/or changes therein) with respect to temperature (e.g., at thermoelectric device(s) having difference characterization temperatures) can be used to detect a deposit condition.

In some examples, monitored deposit levels, deposit rates, and/or other data such as fluid properties (e.g., temperature, constituent concentrations, pH, etc.) can be used to determine a deposition potential of the process fluid on to the use device. In various embodiments, the deposition potential meeting a predetermined threshold and/or changing by a predetermined amount can be used to detect the presence of a deposit condition.

In the event of a deposit condition, the method can include taking corrective action to address the deposit condition (772). The corrective action can include a variety of actions, such as introducing or changing the dose of one or more chemicals in the process fluid, changing the temperature of the process fluid, alerting a user, adjusting the use device for the process fluid (e.g., a heat load on a heat exchanger), increasing a rate of blowdown, and/or other actions that can affect the deposition characteristics of the process fluid. In an exemplary embodiment, deposition characterization can include determining the likely deposited material, such as scale, biofilm, or the like.

In some such embodiments, the corrective action (e.g., 772) can be specifically taken to address the determined deposit material. For instance, a scale inhibitor can be added or increased due to a detected scaling event. However, in some examples, if the deposition characterization is representative of a biofilm rather than scale, a biocide and/or dispersant can be added or increased, one or more process temperatures can be increased, or maintenance and/or cleaning can be performed. Such corrective actions can be performed automatically by the system. Additionally or alternatively, the system can signal to a user to take corrective action to address the deposit condition.

In some embodiments in which the fluid flow system can receive fluid from a plurality of fluid sources (e.g., selectable input sources), the corrective action can include changing the source of fluid input into the system. For instance, in an exemplary embodiment, a fluid flow system can selectively receive an input fluid from a fresh water source and from an effluent stream from another process. The system can initially operate by receiving process fluid from the effluent stream. However, in the event of a detected or potential deposit condition, the source of fluid can be switched to the fresh water source to reduce the possible deposit materials present in the process fluid. Switching the source of fluid can include completely ceasing the flow of fluid from one source and starting the flow of fluid from a different source. Additionally or alternatively, switching sources can include a mixture of the original source (e.g., the effluent stream) and the new source(s) (e.g., the fresh water). For example, in some embodiments, a desired blend of fluid from different input sources (e.g., 50% from one source and 50% from another source) can be selected.

In a similar implementation, in some embodiments, the corrective action can include temporarily stopping flow from a single source (e.g., an effluent source) and providing a process fluid from a different source (e.g., fresh water). The new source of fluid can be used temporarily to flush potential deposit materials from the system before excessive deposit can occur. In some examples, once such materials have been flushed from the system (e.g., via fresh water), the source of the process fluid can be switched back to the original source (e.g., the effluent stream). In some examples, flushing the fluid from the system can be done while operating the use device in the system. In other examples, when certain deposit conditions and/or likelihoods are detected (e.g., a certain deposit potential is reached), flow to the use device can be stopped and the fluid in the system can be directed to a drain to rid the system of such fluid. The system can then direct fluid back to the use device from either fluid source or a combination thereof.

In still another implementation, as described elsewhere herein, a default input fluid can be the combined flow of fluid from each of a plurality of available sources. In the event of detected deposit conditions, one or more of the input flow from one of the fluid sources can be reduced or closed off from the system (e.g., via a shutoff valve). In some examples, systems can include one or more auxiliary sensors configured to monitor one or more parameters of the fluid flowing into the system from each input source, such as a conductivity sensor, concentration sensor, turbidity sensor, or the like. Data from such auxiliary sensors can be used to determine which of the input sources is/are contributing to the deposit condition. Such fluid sources can then be prevented from contributing to the fluid flowing through the system.

Blocking, switching between, and/or combining process fluid input sources can be performed, for example, via one or more valves arranged between the source(s) and the fluid flow system. In various embodiments, the valves can be manually and/or automatically controlled to adjust the source(s) of the input fluid. For example, in some embodiments, a detected deposit condition can cause a controller in communication with one or more such valves to actuate such valves to adjust the source of fluid flowing into the system. Alternatively, the controller can indicate to the user that corrective action should be performed, and the user can actuate such valves to adjust the source of fluid to the system.

As described elsewhere herein, one or more fluid input sources can include one or more thermoelectric devices disposed therein. Such thermoelectric device(s) can be used to characterize deposit conditions for each of the plurality of fluid sources individually. Accordingly, if one fluid source is exhibiting a deposit condition, one or more corrective actions can include performing an action to affect the fluid flowing into the system from that source (e.g., adjusting a parameter of the fluid) and/or blocking the fluid from flowing into the system (e.g., via a valve). In some examples, each input fluid source includes one or more such thermoelectric devices so that each source can be characterized individually. In some such embodiments, one or more thermoelectric devices can additionally be positioned in the fluid flow path after fluid from each of the fluid sources are combined so that the composite fluid can also be characterized separately from each of the individual sources.

In general, taking one or more corrective actions (e.g., step 772) can act to reduce the rate of deposition at the use device. Thus, in some such embodiments, the corrective action acts as a preventative action for preventing undesirable deposits from forming on the use device. This can prolong the operability of the use device while minimizing or eliminating the need to shut down the system in order to clean deposits from the use device.

In some embodiments the taken and/or suggested corrective action can be based on data received from one or more additional sensors (e.g., 111). For instance, in some embodiments, reduction in a scale inhibitor (e.g., detected via a scale inhibitor introduction flow rate meter and/or a scale inhibitor concentration meter) contributes to a deposit condition in the system. Thus, the corrective action can include replenishing a supply of scale inhibitor. Similarly, in some examples, the presence of excess deposit material (e.g., calcium detected by a concentration meter) contributes to a deposit condition. Corresponding corrective action can include introducing or increasing the amount of a scale inhibitor into the system. Similarly, in systems in which wax deposits are possible, reduction in a wax deposit inhibiting chemical such as dispersants, surfactants, and/or cleaners can contribute to a deposit condition. A corresponding corrective action can include increasing a dose or replenishing a supply of such a deposit inhibiting chemical.

Additionally or alternatively, a corrective action can include changing phosphate levels in the fluid. For example, phosphate deposits accumulating in the system can result in reducing the flow of a phosphorus-containing chemical or phosphate deposition catalyst. In other examples, the addition of phosphate-containing fluids may inhibit other deposits from forming. In some such examples, such phosphate- or phosphorus-containing fluids can be added or increased.

Appropriate corrective actions can be determined, in some embodiments, based on the characterized levels of deposits (e.g., at step 768). For example, greater deposition rates and/or deposit potentials can result in greater amounts of a deposition inhibiting chemical to be released into the system to prevent deposits from forming. Additionally or alternatively, characterizations in the type of deposits forming (e.g., by comparing thermal decay profiles at different temperatures) can influence which corrective actions are taken. For example, if characterization of the deposit levels indicates that the deposits are generally sedimentation rather than scaling, releasing scale inhibitor chemicals may not be a useful action, and other, more appropriate action may be taken.

In some examples, monitoring the deposit potential and/or deposit conditions present in a system can be used for optimizing cost and/or efficiency of a system. For instance, in an exemplary industrial application, in some petrochemical applications, a diluting solvent is used to keep viscosity of oil low for processing and pumping of the oil. In some examples, this solvent can include both aromatic and alkane constituents. In some applications, if waxes are present, the alkane fraction of the diluting solvent is used to keep the waxes soluble and in solution. However, some such alkane (e.g., paraffinic) solvents may be expensive. Accordingly, there can be advantages to using as little of such solvents as possible, which may lead to wax deposit problems if too little is used. To help maximize the use of the such alkane solvents, a thermoelectric device can be operated according to systems and methods described herein to monitor deposition profiles as the incoming amount of such solvents is changed in order to find a minimum effective input rate to maintain appropriate solubility of waxes in the oil As another example, in some applications, asphaltenes in crude oil can form deposits if a diluting solvent does not contain enough aromatic solvent. For instance, if too much alkane is present, the asphaltenes may begin to precipitate and deposit. In some examples, such deposition is enhanced with cooler temperatures. Accordingly, cooling a thermoelectric device to a temperature cooler than a typical operating temperature of other system components and monitoring the deposit conditions at the thermoelectric device can indicate a deposit condition due to an excess alkane fraction before harmful deposits occur on other system surfaces. To prevent such deposits, adjustments to the input solvent composition can be made. For example, a controller detecting such a deposit condition can be used to automatically adjust a valve, pump, or other controllable equipment to automatically adjust the solvent composition input into the system. In other examples, the controller can issue an alert to a user, who may manually make appropriate adjustments to the solvent composition.

Various embodiments have been described. Such examples are non-limiting, and do not define or limit the scope of the invention in any way. Rather, these and other examples are within the scope of the following claims.

The invention claimed is:

1. A method for characterizing a level of deposits from a process fluid in a fluid flow system comprising:
    operating a thermoelectric device in a temperature control mode of operation in order to adjust the temperature of the thermoelectric device and induce a deposit from the process fluid to form on a surface of the thermoelectric device in fluid communication with the process fluid, the temperature control mode of operation comprising applying electrical power to the thermoelectric device in order to adjust the temperature thereof, wherein operating the thermoelectric device in the temperature control mode of operation in order to adjust the temperature of the thermoelectric device comprises applying a fixed amount of electrical power to the thermoelectric device in a first polarity in order to reduce the temperature of the thermoelectric device and induce cold deposits on the surface of the thermoelectric device;
    periodically determining the temperature of the thermoelectric device;
    observing changes in thermal behavior of the thermoelectric device, comprising
        observing the change in temperature of the thermoelectric device over time while operating the thermoelectric device at the fixed operating power;
    characterizing the level of deposits from the process fluid onto the thermoelectric device based only on the observed changes in thermal behavior of the thermoelectric device, comprising associating a rate of change in the temperature of the thermoelectric device at the fixed operating power with a level of deposit from the process fluid; and
    applying electrical power to the thermoelectric device in a second polarity; the second polarity being opposite the first, in order to increase the temperature of the thermoelectric device to remove the cold deposits from the surface of the thermoelectric device.

2. The method of claim 1, wherein periodically determining the temperature of the thermoelectric device comprises measuring the temperature of the thermoelectric device via one or more measurement device.

3. The method of claim 1, wherein:
    operating the thermoelectric device in a temperature control mode of operation comprises applying electrical power to the thermoelectric device to operate the thermoelectric device at a fixed temperature;
    periodically determining the temperature of the thermoelectric device provides feedback to confirm the thermoelectric device is operating at the fixed temperature;
    observing changes in the behavior of the thermoelectric device comprises observing a change in the electrical power required to operate the thermoelectric device at the fixed temperature; and
    characterizing the level of deposit from the process fluid comprises associating the rate of change of applied power required to operate the thermoelectric device at the fixed temperature with a level of deposit from the process fluid.

4. The method of claim 1, wherein:
    observing changes in the behavior of the thermoelectric device comprises measuring the rate at which the temperature of the thermoelectric device changes due to the operating the thermoelectric device in the temperature control mode; and
    characterizing the level of deposit from the process fluid onto the thermoelectric device comprises associating the rate the temperature of the thermoelectric device changes with a level of deposit from the process fluid.

5. The method of claim 1, wherein the thermoelectric device comprises a Peltier device.

6. The method of claim 1, wherein periodically determining the temperature of the thermoelectric device comprises periodically switching between the temperature control mode of operation and a measurement mode of operation in order to determine the temperature of the thermoelectric device.

7. The method of claim 6, wherein determining the temperature of the thermoelectric device comprises measuring a voltage across the thermoelectric device to determine the temperature of the thermoelectric device.

8. A method for characterizing an amount of deposits from a process fluid in a fluid flow system comprising:
  operating a thermoelectric device in a temperature control mode of operation in order to adjust the temperature of the thermoelectric device and induce a deposit from the process fluid to form on a surface of the thermoelectric device in fluid communication with the process fluid, the temperature control mode of operation comprising applying electrical power to the thermoelectric device in order to adjust the temperature thereof;
  periodically determining the temperature of the thermoelectric device;
  observing changes in thermal behavior of the thermoelectric device; and
  determining the amount of deposits from the process fluid present on the thermoelectric device based only on the observed changes in thermal behavior of the thermoelectric device.

9. The method of claim 8, further comprising applying electrical power to the thermoelectric device in a second polarity, the second polarity being opposite the first, in order to increase the temperature of the thermoelectric device to remove the cold deposits from the surface of the thermoelectric device.

10. The method of claim 8, wherein operating the thermoelectric device in the temperature control mode of operation in order to adjust the temperature of the thermoelectric device comprises applying a fixed amount of electrical power to the thermoelectric device in a first polarity in order to reduce the temperature of the thermoelectric device and induce cold deposits on the surface of the thermoelectric device.

11. The method of claim 10, wherein determining the amount of deposits from the process fluid onto the thermoelectric device based on the observed changes in thermal behavior of the thermoelectric device comprises associating the rate of change in the temperature of the thermoelectric device at the fixed operating power with the amount of deposit from the process fluid.

* * * * *